United States Patent
Furuno et al.

(10) Patent No.: US 7,858,006 B2
(45) Date of Patent: Dec. 28, 2010

(54) APPARATUS AND METHOD FOR MANUFACTURING LAMINATED SHEET

(75) Inventors: Yoshiharu Furuno, Kusatsu (JP); Fumiyasu Nomura, Otsu (JP); Nobutsugu Chigira, Otsu (JP)

(73) Assignee: Toray Industries, Inc., Tokyo (JP)

( * ) Notice: Subject to any disclaimer, the term of this patent is extended or adjusted under 35 U.S.C. 154(b) by 439 days.

(21) Appl. No.: 11/664,174

(22) PCT Filed: Sep. 22, 2005

(86) PCT No.: PCT/JP2005/017486

§ 371 (c)(1), (2), (4) Date: Mar. 29, 2007

(87) PCT Pub. No.: WO2006/035670

PCT Pub. Date: Apr. 6, 2006

(65) Prior Publication Data

US 2008/0277059 A1     Nov. 13, 2008

(30) Foreign Application Priority Data

Sep. 30, 2004 (JP) .............................. 2004-286924

(51) Int. Cl.
     *B29C 47/06*      (2006.01)
     *B29C 47/14*      (2006.01)
     *B29C 47/70*      (2006.01)

(52) U.S. Cl. ............................... 264/173.12; 425/133.5; 425/462; 425/463

(58) Field of Classification Search ............... 425/133.5, 425/381, 382 R, 462, 463, 464; 264/171.1, 264/173.11, 173.12, 173.16
See application file for complete search history.

(56) References Cited

U.S. PATENT DOCUMENTS

| | | | | |
|---|---|---|---|---|
| 3,557,265 A | * | 1/1971 | Chisholm et al. | 264/46.1 |
| 3,576,707 A | * | 4/1971 | Schrenk et al. | 428/36.91 |
| 3,759,647 A | * | 9/1973 | Schrenk et al. | 425/133.5 |

(Continued)

FOREIGN PATENT DOCUMENTS

JP      50-6860 B      3/1975

(Continued)

OTHER PUBLICATIONS

English Machine Translation of JP 2003-112355, of record.*

(Continued)

*Primary Examiner*—Joseph S Del Sole
*Assistant Examiner*—Robert Dye
(74) *Attorney, Agent, or Firm*—RatnerPrestia

(57) ABSTRACT

An apparatus is provided for manufacturing a laminated sheet wherein different molten resins are alternately laminated by providing a multitude of slits arranged at intervals and permitting the different molten resins to flow out from the adjacent slits. A value of a shortest flow path length (L1) to a longest flow path length (L2) of the molten resin that flows from an inlet to an outlet of the slit, which is a ratio of (L1)/(L2), is 0.5 or more. The slits include slits having different slit lengths. A flow quantity of the molten resin at the slit is changed by changing the intervals of the slits, length of the slits or by changing the temperature of the molten resin at the slits.

27 Claims, 22 Drawing Sheets

U.S. PATENT DOCUMENTS 4,125,581 A * 11/1978 Rasmussen .................. 264/49
4,426,344 A * 1/1984 Dinter et al. ........... 264/173.15
5,389,324 A * 2/1995 Lewis et al. ............ 264/173.12

FOREIGN PATENT DOCUMENTS

| | | |
|---|---|---|
| JP | 2000-127227 A | 5/2000 |
| JP | 2003-112355 A | 4/2003 |
| JP | 2003-251675 A | 9/2003 |

OTHER PUBLICATIONS

International Search Report dated Jan. 10, 2006, application No. PCT/JP2005/017486.

* cited by examiner

PRIOR ART

APPARATUS AND METHOD FOR MANUFACTURING LAMINATED SHEET

This is a U.S. National Phase application number PCT/JP2005/017486, filed Sep. 22, 2005.

TECHNICAL FIELD

The present invention relates to an apparatus and a method for producing a laminated sheet, suitable for producing a multilayer film. A laminated sheet produced by the present invention is formed by laminating plural kinds of molten materials (for example, molten resins or molten polymers) in plural layers as many as more than the number of the kinds, and subsequently solidifying the molten materials. In the laminated sheet produced by the invention, the thicknesses of the respective layers are substantially uniform in the width direction of the sheet. That is, the lamination accuracy of the respective layers in the width direction of the sheet is good. A certain version of the laminated sheet produced according to the invention can be preferably used as an optical interference film, since it has an optical feature based on the fact that the layer thicknesses of the respective layers are accurately different in the thickness direction of the laminated sheet.

BACKGROUND ART

Plural (for example, two) kinds of molten materials are supplied into manifolds respectively provided for accepting them individually, and from the respective manifolds, the respective molten materials are made to flow through plural tiny holes or plural slits, to form layer streams of the plural molten materials. The layer streams of the plural molten materials are then laminated to form a multilayer molten material sheet, and the sheet is discharged from a slit die extending in the direction perpendicular to the direction (in the width direction of the sheet) in which the respective layers of the molten materials are laminated, to form a laminated sheet (such method is described in and known by, for example, the Patent Document 1, the Patent Document 2 or the Patent Document 3). The laminated sheet discharged from the die is used as a multilayer film as it is or after it is stretched or post-treated in any other way.

A typical example of an apparatus for producing the laminated sheet is shown in FIG. 1. In FIG. 1, the laminated sheet production apparatus is composed of a molten resin introducing pipe 1 for being supplied one molten resin A, a molten resin introducing pipe 2 for being supplied another molten resin B, a multilayer feed block 3 for forming layer streams consisting of the molten resin A supplied from the molten resin introducing pipe 1 and the molten resin B supplied from the molten resin introducing pipe 2, a conduit pipe 4 for allowing the formed layer streams to flow through it, a die 5 for adjusting the width and thicknesses of the layer streams fed through the conduit pipe 4 to predetermined values, and discharging the adjusted layer streams, to form a laminated sheet having the molten material A and the molten material B laminated alternately, and a casting drum 7 for cooling and solidifying the laminated sheet 6 discharged from the die 5. The laminated sheet solidified by the casting drum 7 is usually called an un-drawn film 8. The un-drawn film 8 is usually fed to a drawing step (not shown in the drawing) as indicated by arrow NS, and drawn in one or two directions, as a multilayer film.

The multilayer feed block 3 has in it, a manifold connected with the molten material introducing pipe 1, a manifold connected with the molten material introducing pipe 2, plural slits arranged with predetermined intervals kept between them, and a laminating portion for laminating the streams of the respective molten materials having passed through the slits. The plural slits are classified into two groups, and the plural slits of one group are open to the outlet of the manifold connected with the molten material introducing pipe 1, while the plural slits of the other group are open to the outlet of the manifold connected with the molten material introducing pipe 2. The outlet of the laminating portion communicates with the conduit pipe 4.

The basic constitution of the laminated sheet production apparatus of the invention is substantially the same as the basic constitution of the laminated sheet production apparatus shown in FIG. 1. However, the laminated sheet production apparatus of the invention is characterized by the structure of the multilayer feed block used therein.

An example of the multilayer feed block used in the conventional laminated sheet production apparatus is shown in FIG. 11. FIG. 11 shows spaces formed in the multilayer feed block.

In FIG. 11, a multilayer feed block 101 has a resin introducing path 102 installed for introducing a molten resin A into the block 101 and a resin introducing path 103 installed for introducing a molten resin B into the block. The multilayer feed block 101 is internally provided with a manifold 104 connected with the resin introducing path 102 and a manifold 105 connected with the resin introducing path 103. The manifold 104 distributes the flow of the molten resin A introduced from the resin introducing path 102 over the entire width in the longitudinal direction of the multilayer feed block 101 (X-axis direction shown in FIG. 11). The manifold 105 distributes the flow of the molten resin B introduced from the resin introducing path 103 over the entire width in the longitudinal direction of the multilayer feed block 101 (X-axis direction shown in FIG. 11).

Furthermore, in the multilayer feed block 101, numerous slits are provided with predetermined intervals 110 kept between them. The numerous slits comprise a group of slit comprising plural slits 108 and a group of slit comprising plural slits 109. The slits 108 and the slits 109 are arranged alternately with intervals 110 kept between them. The inlet of each of the slits 108 is connected with the outlet of each of tiny holes 106, and the inlets of the tiny holes 106 are connected with the manifold 104. The inlet of each of the slits 109 is connected with outlet of each of tiny holes 107, and the inlets of the tiny holes 107 are connected with the manifold 105.

Furthermore, the multilayer feed block 101 is internally provided with a laminating portion (not shown in the drawing) connected with the outlets of the respective slits 108 and the respective slits 109. In the laminating portion, the streams of the molten resin A flowing from the outlets of the respective slits 108 and the streams of the molten resin B flowing from the outlets of the respective slits 109 form alternate layer streams of molten resins.

The respective slits 108 and 109 are formed, for example, by a comb-like rectangle (slit plate) having numerous slits formed with intervals (corresponding to the intervals 110) kept between them in the longitudinal direction (X-axis direction shown in FIG. 11) of the rectangle (or the plate) to pass through the rectangle in the width direction (Y-axis direction shown in FIG. 11) of the rectangle, extending from the bottom surface toward the top surface (Z-axis direction shown in FIG. 11) of the rectangle without reaching the top surface of the rectangle.

In the multilayer feed block 101, the molten resin A flows from the manifold 104 into the tiny holes 106 and subsequently into the slits 108. On the other hand, the molten resin B flows from the manifold 105 into the tiny holes 107 and subsequently into the slits 109.

The structure of the conventional multilayer feed block 101 explained above is also shown in the Patent Document 2. In the conventional multilayer feed block 101, the slits 108 and 109 formed in the slit plate are formed such that the slit lengths (the slit lengths in Z-axis direction shown in FIG. 11) at both the ends of each of the slits in the width direction of the slit (Y-axis direction shown in FIG. 11) are equal to each other, in view of easer machining and lower machining cost.

Therefore, when the molten resin is introduced from each of the tiny holes 106 (or 107) formed in a lateral face of the corresponding slit 108 (or 109) into the slit, as shown in FIG. 12, a length difference exists between the flow path length L1 of the resin to the outlet SO of the slit 108 (or 109) on the side near the tiny hole 106 (or 107) and the flow path length L2 of the resin to the outlet SO of the slit 108 (or 109) on the side far from the tiny hole 106 (or 107).

For this reason, the flow rate of the molten resin at the outlet SO of the slit 108 (or 109) is large at the slit outlet Son near the tiny hole 106 (or 107) and gradually decreases from there to the slit outlet Sof far from the tiny hole 106 (or 107). That is, the flow rate of the molten resin at the slit outlet Son near the tiny hole 106 (or 107) is larger than the flow rate of the molten resin at the slit outlet Sof far from the tiny hole 106 (or 107).

While the difference in the flow rate of the molten resin is kept in the width direction (Y-axis direction shown in FIG. 12) at the outlet SO of each slit, the streams of the molten resins discharged from the respective slits are laminated at the laminating portion, to form layer streams of the molten resins. The layer streams in this state are extruded from the die 5 in such a manner that the lamination direction (X-axis direction shown in FIG. 11) corresponds to the thickness direction of the produced multilayer film, in other words, in such a manner that the width direction (Y-axis direction shown in FIG. 11) of the slits corresponds to the width direction of the produced multilayer film, for forming the intended multilayer film. The thicknesses of the respective layers of the multilayer film formed like this are not constant in the width direction. That is, a multilayer film with the thicknesses of its respective layers kept uniform in the width direction cannot be obtained.

Furthermore, the conventional multilayer feed block 101 has a possibility that the molten resin is retained in the top portion of each slit far from the corresponding tiny hole 106 (or 107). If the molten resin is retained there, a problem that the resin is thermally deteriorated occurs.

Meanwhile, in FIG. 12, the series concerned with the flow of the molten resin A, including the manifold 104, the tiny hole 106 and the slit 108 and the series concerned with the flow of the molten resin B including the manifold 105, the tiny hole 107 and the slit 109 are shown in the same direction in the drawing. However, as can be seen from FIG. 11, actually one series and the other series are reverse to each other in direction.

In the multilayer feed block shown in the Patent Document 3, each slit is formed to have a circular arc at the top. This design is considered to decrease the residence of the molten resin in the top corner of each slit. However, the problem that the thicknesses of the respective layers are not uniform in the width direction of the multilayer film because of the above-mentioned difference in the flow path length of the molten resin in each slit is not solved yet.

Furthermore, since the respective slits are internally formed to have a circular arc partially, it is difficult to machine the slits especially in the case where the slit gaps are small, and furthermore since the structure needs tiny holes, there is a problem that the slit plate production cost is high. Moreover, since the top of each slit is formed to have a depressed circular arc, there is a problem that maintenance such as washing is complicated.

Known is an optical interference film capable of reflecting or transmitting light with a broad-band wavelength, in which a resin having a high refractive index and a resin having a low refractive index are alternately laminated in the thickness direction of the film at the same rates with the thickness of each pair of layers gradually decreased or increased.

If the multilayer film, in which the respective layers or respective pairs of layers change or successively change in the thickness direction of the film, is produced using the above-mentioned conventional multilayer feed block, the slit gaps of the respective slits formed in the above-mentioned slit plate must be changed in the lamination direction of the respective layers of the produced multilayer film. However, in this case, the slits must be machined at very high accuracy, and for a requested multilayer film, it becomes necessary to change sizes of gaps of the slits in the order of 1 μm or less. However, it is difficult to meet this request with the presently available machining technique alone.

The Patent Document 2 proposes to control the temperature distribution of the feed block for forming layers respectively different in thickness. However, it is difficult to accurately control the thicknesses of tens of or hundreds of layers by this method.

On the other hand, for the purpose of obtaining an optical interference film, the lamination constitution of the respective layers of a multilayer film was designed, and the above-mentioned conventional multilayer feed block was used in an attempt to mold a multilayer film. However, it was found that in the molded multilayer film, the layers closer to the surface of the film were thinner than the design layer thicknesses (intended layer thicknesses) of the film, and this phenomenon was more outstanding than the expected thickness irregularities of the respective layers. That is, it was found that it is difficult to produce a multilayer film having the intended thicknesses of respective layers using the conventional multilayer feed block.

Patent Document 1: JP 50-6860 B
Patent Document 2: JP 2003-112355 A
Patent Document 3: JP 2003-251675 A

DISCLOSURE OF THE INVENTION

Problems to be Solved by the Invention

A general object of the invention is to provide an apparatus for producing a laminated sheet which allows easy production of a laminated sheet having layers each of which has intended or design thickness value.

One object of the invention is to provide an apparatus for producing a laminated sheet which allows the production of a laminated sheet having layers each of which has a substantially uniform thickness in the width direction of the sheet.

Another object of the invention is to provide an apparatus for producing a laminated sheet which is free from portions having any molten resin retained within slits, hence capable of preventing thermal deterioration of molten resins, to allow production of a laminated sheet for a long period of time.

A still another object of the invention is to provide an apparatus for producing a laminated sheet which allows slits to be machined easily at a low production cost.

A further object of the invention is to provide an apparatus for producing a laminated sheet which allows easier maintenance in slit washing, etc.

A still further object of the invention is to provide an apparatus for producing a laminated sheet which allows easy production of a laminated sheet having layers each of which has intended thicknesses, especially intended thicknesses different from layer to layer.

Another object of the invention is to provide an apparatus for producing a laminated sheet which allows efficient change of dimensions of slits into optimum dimensions for the purpose of changing the flow rates of molten resins in the slits.

A further object of the invention is to provide a method for producing a laminated sheet using the apparatus for producing a laminated sheet of the invention.

Means for Solving the Problems

An apparatus for producing a laminated sheet of the invention for achieving the above-mentioned objects is as follows.

First Embodiment of the Apparatus for Producing a Laminated Sheet of the Invention An apparatus for producing a laminated sheet, in which plural molten kinds of molten materials are laminated in plural layers as many as more than the number of the kinds of molten materials, comprising plural manifolds respectively used for supplying the respective molten materials, plural slits provided in correspondence to the respective manifolds and disposed with predetermined intervals kept between them so that the molten materials supplied into the respective manifolds can pass through the slits corresponding to the respective layers, and a laminating portion for laminating the molten materials having passed through the respective slits in order to form the layers, wherein each of the plural slits formed in correspondence to at least two manifolds out of the plural manifolds is such that in the width direction of the slit in the flow path of the corresponding molten material from the outlet of the corresponding manifold to the outlet of the slit, the ratio $L1/L2$ of the flow path length $L1$ of the first flow path portion on the side near the manifold to the flow path length $L2$ of the second flow path portion on the side far from the manifold is 0.5 or more.

In the first embodiment of the production apparatus, it is preferred that the ratio $L1/L2$ is 0.55 or more.

In the first embodiment of the production apparatus, it is preferred that the upstream section of the second flow path portion is formed as a flow path section kept inclined more downward in the downstream direction as it leaves from the manifold.

In the first embodiment of the production apparatus, it is preferred that the inclined flow path section is formed as an inclined flow path section inclined straight. With this constitution, the slits having the ratio $L1/L2$ of 0.5 or more can be easily designed, and the slits can be easily manufactured. Furthermore, the residence of the corresponding molten resin in the slit can be reduced or substantially eliminated.

In the first embodiment of the production apparatus, it is preferred that the slit width at the outlet of each of the slits is from 10 mm to 200 mm. If the slit width is less than 10 mm, the strength of the member around the slits may become insufficient. If the slit width is more than 200 mm, it may be difficult to accurately machine the slit gap.

In the first embodiment of the production apparatus, it is more preferred that the slit width at the outlet of each of the slits is from 20 mm to 100 mm.

In the first embodiment of the production apparatus, it is preferred that the slit gap of each of the slits is from 0.1 mm to 5 mm. If the slit gap is less than 0.1 mm, it may become difficult to control the machine used for machining the slits. If the slit gap is more than 5 mm, the feed block may become too large in the longitudinal direction (resin lamination direction) when the feed block is large in the number of layers to be laminated, and since the pressure loss of the molten resins flowing through the respective slits becomes too small, it may become difficult to unifies the flow rates of the molten resins flowing through the respective slits.

In the first embodiment of the production apparatus, it is preferred that the flow path length LC of the central flow path portion passing through the center in the width direction of each of the slits in the flow path of the slit is from 20 mm to 200 mm. If the flow path length LC of the central flow path portion is less than 20 mm, the pressure loss of the molten resins flowing through the respective slits becomes small, and it may become difficult to unify the flow rates of the molten resins flowing through the respective slits. If the flow path length LC of the central flow path portion is more than 200 mm, the pressure loss becomes too large, and the leak of molten resins may occur, or in the case where the apparatus is repetitively used, the slits may be deformed.

In the first embodiment of the production apparatus, it is more preferred that the flow path length LC of the central flow path portion is from 30 mm to 100 mm.

In the first embodiment of the invention, it is preferred that the number of the plural slits is from 10 to 1,000.

Second Embodiment of the Apparatus for Producing a Laminated Sheet of the Invention An apparatus for producing a laminated sheet, in which plural kinds of molten materials are laminated in plural layers as many as more than the number of said kinds of molten materials, comprising plural slits disposed with predetermined intervals kept between them for allowing the respective molten materials to pass through the slits corresponding to the respective layers, and a laminating portion for laminating the respective molten materials having passed through the respective slits in order to form the layers, wherein the slit length of at least one slit of the plural slits and the slit length of at least one slit of the other slits are different from each other or the slit gap of at least one slit of the plural slits and the slit gap of at least one slit of the other slits are different from each other.

In the second embodiment of the production apparatus, it is preferred that except or including the slits located at both ends of the plural slits, the slit lengths of the respective slits change monotonously in the arrangement direction of the slits from the slit at one end toward the slit at the other end. The monotonous change can be a straight change or a curved change.

In the second embodiment of the production apparatus, it is preferred that the slit lengths of the respective slits are from 10 mm to 200 mm. If the slit lengths are less than 10 mm, the pressure loss of the molten resins flowing through the respective slits becomes too small, and it may become difficult to keep the flow rates of the molten resins flowing through the respective slits at predetermined flow rates. If the slit lengths are more than 200 mm, the pressure loss becomes too large, and the leak of molten resins may occur, and in the case where the apparatus is repetitively used, the slits may be deformed.

In the second embodiment of the production apparatus, it is preferred that except or including the slits located at both ends of the plural slits, the slit gaps of plural slits corresponding to the respective molten materials are substantially the same.

That the slit gaps of plural slits corresponding to the respective molten materials are substantially the same includes that the slit gaps of plural slits which one molten material passes through are substantially the same, while the slit gaps of plural slits which the other molten material passes through are substantially the same. That is, for example, it includes that the slit gaps of plural slits which the molten resin A passes through are 0.7 mm, while the slit gaps of plural slits which the molten resin B passes through are 0.5 mm. In case where the slit gaps of plural slits are substantially the same, it is preferable that each of the slit gaps is in the range of −5% to +5% of the common intended value. In the case where the slit gaps of plural slits are substantially the same, if the slit lengths of the slits are made different, the thicknesses of respective layers can be easily and accurately controlled to intended thicknesses.

In the second embodiment of the production apparatus, it is preferred that the slit gaps of said respective slits are from 0.1 mm to 5 mm. If the slit gaps are less than 0.1 mm, it may become difficult to control the machine used for machining the slits. In the case the slit gaps are more than 5 mm, the feed block may become too large in the longitudinal direction (resin lamination direction) in a feed block having a large number of layers to be laminated. Furthermore, the pressure loss of the molten resins flowing through the respective slits becomes too small, and it may become difficult to achieve the intended flow rates as the flow rates of the molten resins flowing through the respective slits.

In the second embodiment of the production apparatus, it is preferred that the number of the plural slits is from 10 to 1,000.

First Embodiment of the Method for Producing a Laminated Sheet of the Invention A method for producing a laminated sheet comprising the step of supplying plural kinds of molten materials respectively into the plural manifolds of the apparatus for producing a laminated sheet defined with either the first embodiment or second embodiment of the production apparatus, the step of letting the molten materials supplied into the respective manifolds pass through the plural slits provided in correspondence to the respective manifolds of the apparatus, the step of laminating the streams of the respective molten materials having passed through the respective slits, by means of the laminating portion of, the apparatus, for forming layer streams of the respective molten materials, the step of deriving the layer streams from the laminating portion, and the step of solidifying the respective molten materials of the derived layer streams, to form a laminated sheet comprising plural layers of respective materials formed by solidifying the respective molten materials.

Third Embodiment of the Apparatus for Producing a Laminated Sheet of the Invention An apparatus for producing a laminated sheet, in which plural kinds of molten materials are laminated in plural layers as many as more than the number of said kinds of molten materials, comprising plural slits disposed with predetermined intervals kept between them for allowing the respective molten materials to pass through the slits corresponding to the respective layers, a laminating portion for laminating the respective molten materials having passed through the respective slits in order to form the layers, a device for deriving a multilayer molten material sheet composed of respective molten materials laminated by the laminating portion, from the laminating portion, and a laminated sheet forming device for solidifying the respective molten materials of the derived multilayer molten material sheet, for forming a laminated sheet comprising the plural kinds of materials formed by solidifying the respective molten materials, wherein the flow rate of the corresponding one of the molten materials, flowing through at least one slit of the plural slits, can be changed based on the layer thickness information obtained by measuring the thicknesses of desired layers of the formed laminated sheet.

In the third embodiment of the production apparatus, the flow rate of the molten material can be changed by changing the slit gap and/or the slit length of the slit.

In the third embodiment of the production apparatus, it is preferred that the measurement of the thicknesses of the layers is performed for all the respective layers of the laminated sheet, and that the flow rate of the molten material is changed by changing the slit gap.

In the third embodiment of the production apparatus, it is preferred that the measurement of the thicknesses of the layers is performed for all the respective layers of the laminated sheet, and that the flow rate of the molten material is changed by changing the slit length.

In the third embodiment of the production apparatus, it is preferred that the flow rate of the molten material is changed by changing the temperature of the molten material passing through the slit caused by changing the temperature of the slit.

In the third embodiment of the production apparatus, it is preferred that the flow rate of the molten material is changed by making the slit gaps of the slits used for forming layers positioned in outer layer portions in the thickness direction of the laminated sheet larger than the slit gap of the slit used for forming a layer positioned in an inner layer portion.

In the third embodiment of the production apparatus, it is preferred that the flow rate of the molten material is changed by making the slit lengths of the slits used for forming layers positioned in outer layer portions in the thickness direction of the laminated sheet shorter than the slit length of the slit used for forming a layer positioned in an inner layer portion.

In the third embodiment of the production apparatus, the flow rate of the molten material can be changed by mechanically or thermally changing the slit gap and/or the slit length of at least one slit of the plural slits.

In the third embodiment of the production apparatus, it is preferred that if the measured thickness value of a given layer x in the thickness direction of the laminated sheet is $T(x)$, the slit gap corresponding to the measured thickness value is $d(x)$, the slit length is $L(x)$, the intended thickness of the layer x is $Ta(x)$, the intended slit gap corresponding to the intended thickness is $da(x)$, and the intended slit length is $La(x)$, then the flow rate of the molten material in the slit corresponding to the layer x is changed to satisfy the relation represented by the following formula (I):

$$Ta(x)/T(x)=[La(x)/L(x)]\times[d(x)^3/da(x)^3] \quad (1)$$

In the case where the lamination distribution of the obtained laminated sheet deviates from any intended value, if the slit gap d and the slit length L are changed to satisfy the relation of the above formula (I), the lamination distribution can be made to substantially conform to the intended value.

The formula (I) includes a slit gap and a slit length as two parameters. As the case may be, either one can be fixed in an attempt to change the other. For example, in the case where the slit gap distribution is changed, the slit gap can be calculated with the slit length ratio as $La/L=1$. Since the slit gap changes at a third-power rate, the change of the slit gap is effective for correcting a large thickness deviation. On the contrary, if a slight thickness distribution is desired, it is effective to change the slit length since change of which acts linearly.

Second Embodiment of the Method for Producing a Laminated Sheet of the Invention A method for producing a laminated sheet comprising the step of supplying plural kinds of molten materials respectively into plural slits of an apparatus for producing a laminated sheet defined with the third embodiment of the production apparatus, and the step of forming a laminated sheet by the apparatus.

Effects of the Invention

The apparatus for producing a laminated sheet of the invention allows easy production of a laminated sheet comprising layers respectively having intended or design thicknesses values.

In the apparatus for producing a laminated sheet of the invention, if the ratio L1/L2 of the flow path lengths of a molten material in each slit is kept at 0.5 or more, the fluctuation in the pressure loss or flow rate of the molten material passing through each slit at different positions (different flow paths) in the slit can be kept small. As a result, the fluctuation of the thickness of each layer in the slit width direction at the outlet of the slit can be kept small, and a laminated sheet having uniform layers can be obtained. That is, a laminated sheet with good layer accuracy or a laminated sheet with good uniformity in the width direction of the sheet can be obtained.

In the apparatus for producing a laminated sheet of the invention, it is not necessary to use the tiny holes formed between the manifolds and the slits of the conventional laminated sheet production apparatus, and the molten materials from the respective manifolds can be directly introduced into the corresponding respective slits. As a result, the entire constitution and machining of the apparatus can be simplified, and the apparatus production cost can also be reduced. Furthermore, since the manifold forming members can be directly installed on both sides of the slit forming member, the slits can be opened on both sides if the manifold forming members are removed. So, maintenance such as slit washing can be performed very easily.

If the upstream section of the second flow path portion in each slit is inclined, especially inclined to be straight for allowing easy and cheap machining, the residence of the molten material in the slit can be prevented, and the thermal deterioration of the resin can also be prevented. As a result, laminated sheet production can be performed for a long period of time.

In the laminated sheet production apparatus of the invention, if the slit lengths of the respective slits are made different from each other, the thicknesses of the respective layers can be easily controlled to desired values. Furthermore, since the slit gaps can also be kept constant, the slits can be easily machined. Furthermore, if the slit lengths are made continuously different in the slit arrangement direction, the thicknesses of the respective layers can be made continuously different, and a laminated sheet having intended optical characteristics can be easily produced.

In the laminated sheet production apparatus of the invention, since the layer thickness information of an actually molded laminated sheet can be used to easily change the flow rates of the molten materials in the respective slits of the multilayer feed block to optimum flow rates, a laminated sheet having an intended layer constitution can be easily produced.

In the laminated sheet production apparatus of the invention, since the layer thickness information of an actually molded laminated sheet can be used to easily change the dimensions of the respective slits of the multilayer feed block to optimum dimensions, a laminated sheet having an intended layer constitution can be easily produced.

MEANINGS OF SYMBOLS

Figure 1:
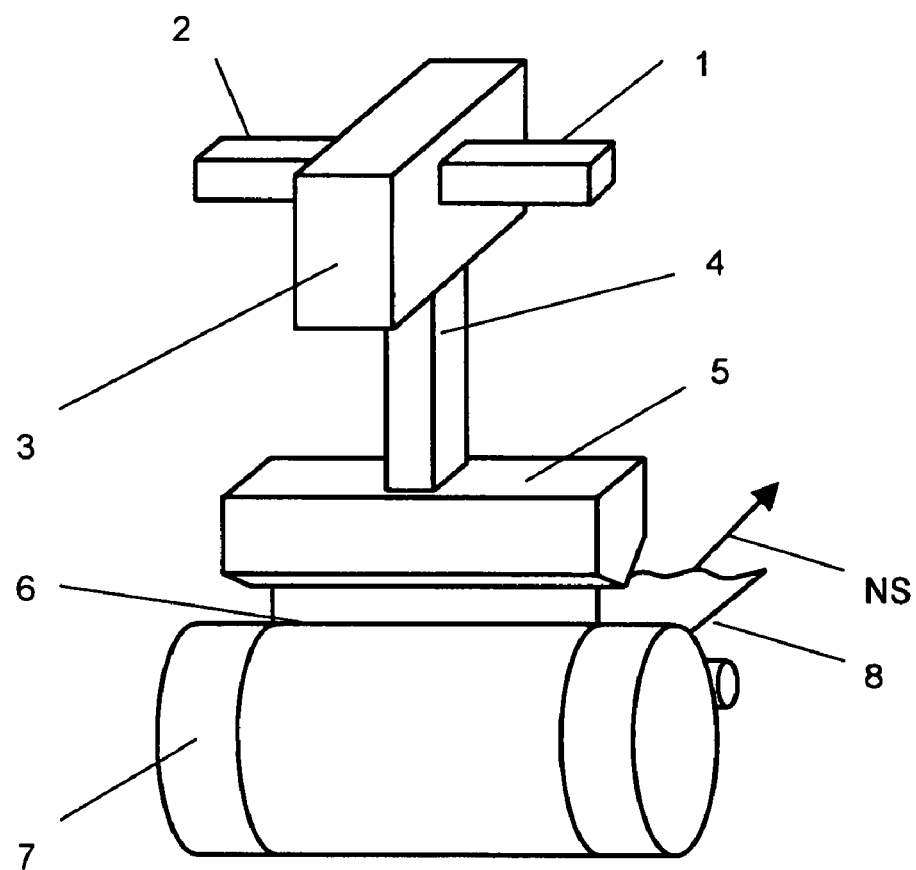
FIG. 1 is a perspective view for explaining the generally used laminated sheet production apparatus and process used also for carrying out the invention.

1: molten resin introducing pipe for supplying molten resin A
2: molten resin introducing pipe for supplying molten resin
3: multilayer feed block
4: conduit pipe in which layer streams flow
5: die (T die)
6: laminated sheet
7: casting drum
8: cast film
11: multilayer feed block
12, 13: resin introducing path
14: manifold of resin A side
15: manifold of resin B side
16, 17: slit
18: laminating portion
19: discharge path
20: slit plate
20a: laminating portion/discharge path forming member
20b: partition wall
21, 22: lateral plate
23, 24: inclined section
25: first flow path portion
26: second flow path portion
30: thickness direction of film
31, 31a, 31b: laminated sheet (multilayer film)
32, 32a, 32b: layer composed of resin A
33, 33a, 33b: layer composed of resin B
35: reflectance region
51: multilayer feed block
52: slit gap retaining and deflecting portion
53: cartridge heater
54: heat bolt
61: multilayer feed block 62: slit gap retaining and deflecting portion
101: multilayer feed block
102, 103: resin introducing path
104: manifold of resin A side
105: manifold of resin B side
106, 107: tiny hole
108, 109: slit

THE BEST MODES FOR CARRYING OUT THE INVENTION

Figure 2:
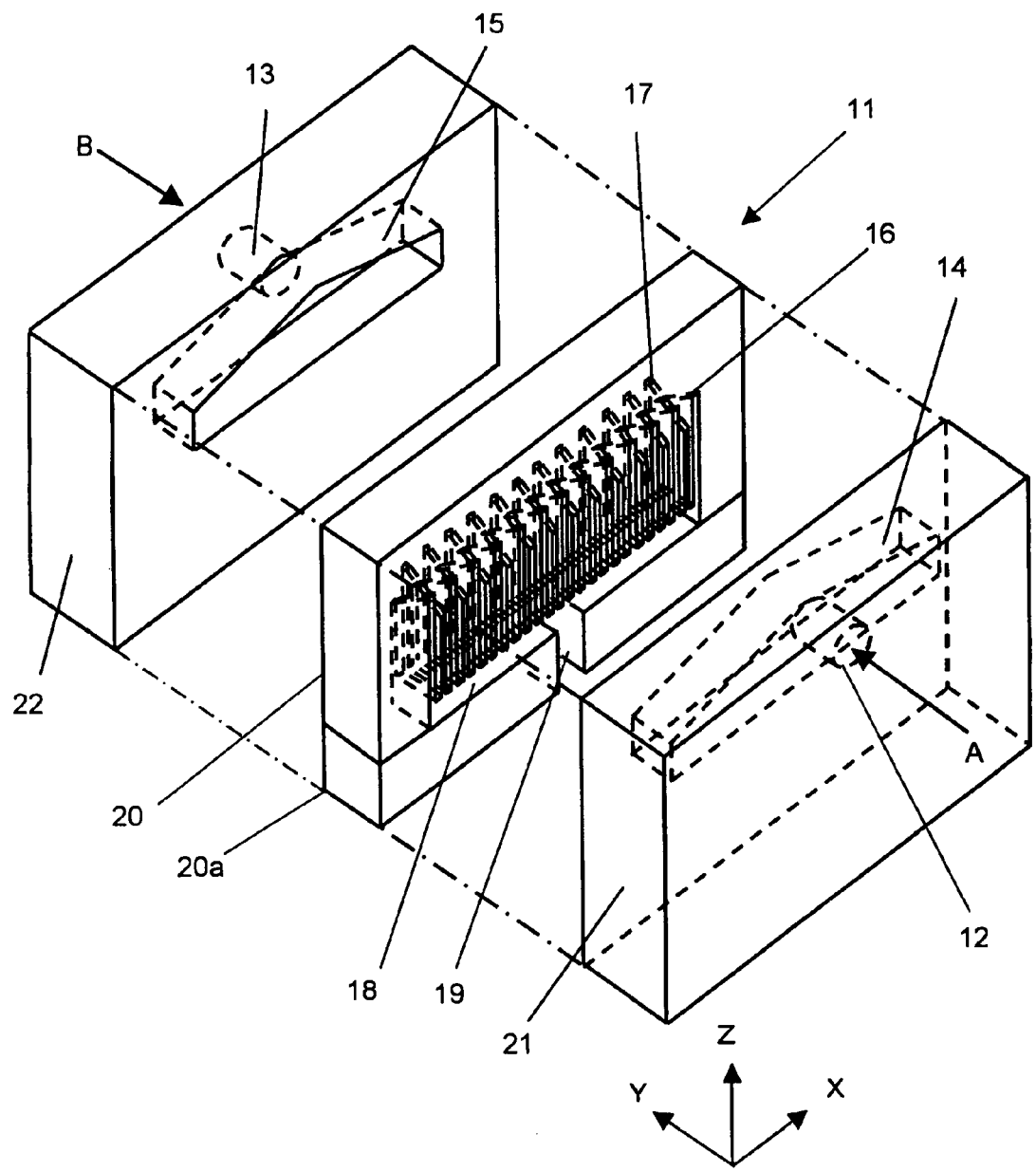
FIG. 2 is an exploded perspective view showing an example of the multilayer feed block (hereinafter may also be simply called the multilayer feed block of the invention for simplification of explanation) used in the laminated sheet production apparatus of the invention.
Figure 3:
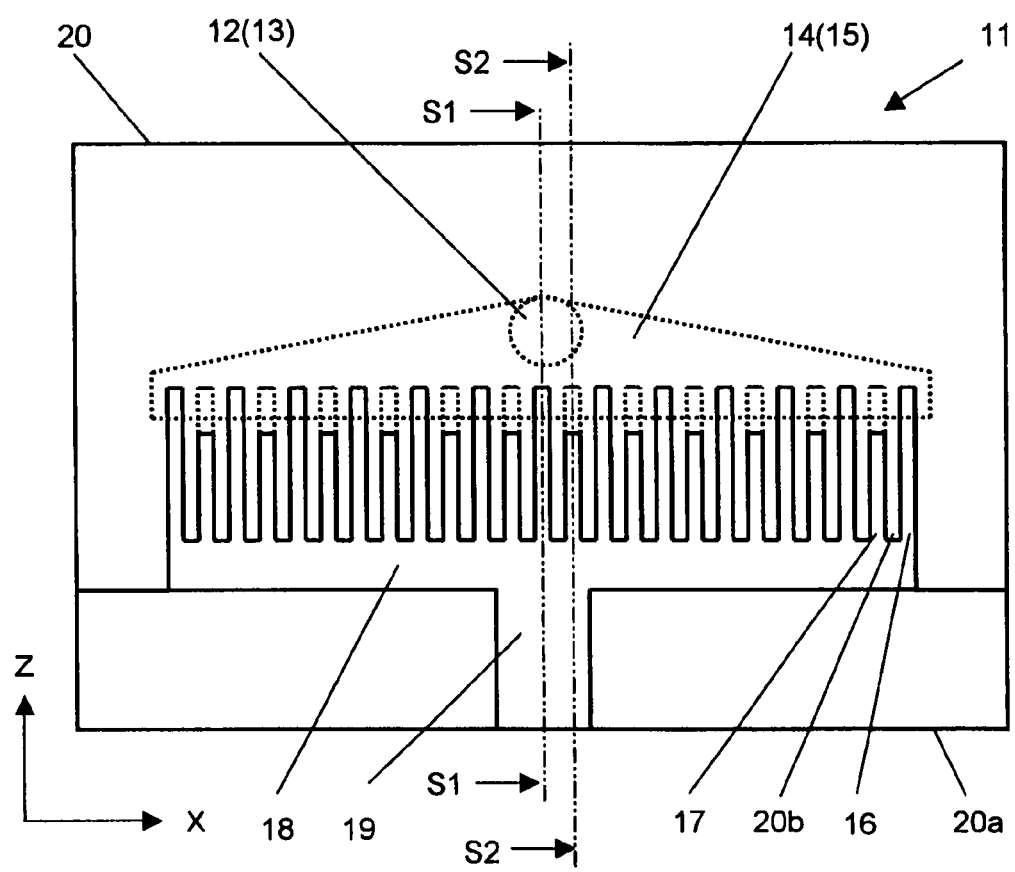
FIG. 3 is a front view showing the slit plate (hereinafter may be simply called the slit plate of the invention for simplification of explanation) and laminating portion/discharge path forming member in the multilayer feed block of the invention.

FIGS. 2 through 6 are drawings relating to a multilayer feed block 11 used in an example of the first embodiment of the laminated sheet production apparatus of the invention. FIG. 2 is an exploded perspective view showing the multilayer feed block 11. FIG. 3 is a front view showing a slit plate 20 and a laminating portion/discharge path forming member 20a.

In FIGS. 2 and 3, the multilayer feed block 11 comprises lateral plates 21 and 22 and a slit plate 20 placed between the lateral plates 21 and 22. The slit plate 20 has a laminating portion/discharge path forming member 20a connected below it.

The lateral plate 21 has a manifold 14 of resin A side formed to extend in the longitudinal direction (X-axis direction shown in FIG. 2), and the manifold 14 is connected with a resin introducing path 12 for supplying resin A of molten state (molten resin A) into the manifold 14. The lateral plate 22 has a manifold 15 of resin B side formed to extend in the longitudinal direction (X-direction shown in FIG. 2), and the manifold 15 is connected with a resin introducing path 13 for supplying resin B of molten state (molten resin B) into the manifold 15.

The slit plate 20 has numerous slits 16 and numerous slits 17 formed respectively through a partition wall 20b in the longitudinal direction (X-axis direction shown in FIG. 3). The slits 16 and the slits 17 are alternately positioned respectively through the partition wall 20b. The respective slits 16 and 17 are formed in the slit plate 20 from the bottom face of the slit plate 20 toward the top face (Z-axis direction shown in FIG. 3) at predetermined lengths. The lateral faces of the respective slits 16 and 17 on both sides are open on both the lateral faces of the slit plate 20.

In the state where the lateral plate 21, the slit plate 20 and the lateral plate 22 are assembled, the inlets of the respective slits 16 are formed to be directly open to the outlet of the manifold 14, and the inlets of the respective slits 17 are formed to be directly open to the outlet of the manifold 15. Furthermore, the openings on the lateral faces other than the inlets of the respective slits 16 are closed by the wall surfaces of the lateral plates 21 and 22, and the openings on the lateral faces other than the inlets of the respective slits 17 are closed by the wall surfaces of the lateral plates 21 and 22. The inlets of the respective slits 16 and 17 are directly open to the outlets of the manifolds 14 and 15, and neither the tiny holes nor the tiny hole forming members of the conventional multilayer feed block exist between the outlets of the manifolds and the inlets of the slits.

The resin introducing path 12 is connected with the resin introducing pipe 1 shown in FIG. 1, and is supplied with the molten resin A from the resin introducing pipe 1. The molten resin A supplied from the resin introducing path 12 into the manifold 14 flows in the manifold 14 in the longitudinal direction of the manifold 14 (X-axis direction shown in FIG. 2), to fill the manifold 14. The molten resin A in the manifold 14 flows from the inlets of the respective slits 16 open to the manifold 14 into the respective slits 16, and flows down in the respective slits 16, further flowing from the outlets of the respective slits 16 into the laminating portion 18.

The resin introducing path 13 is connected with the resin introducing pipe 2 shown in FIG. 1 and is supplied with the molten resin B from the resin introducing pipe 2. The molten resin B supplied from the resin introducing path 13 into the manifold 15 flows in the manifold 15 in the longitudinal direction of the manifold 15 (X-axis direction shown in FIG. 2), to fill the manifold 15. The molten resin B in the manifold 15 flows from the inlets of the respective slits 17 open to the manifold 15 into the respective slits 17, and flows down in the respective slits 17, further flowing from the outlets of the respective slits 17 into the laminating portion 18.

The respective sheet-like streams of the molten resin A and the respective sheet-like streams of the molten resin B respectively having the transverse sectional forms following the forms of the transverse sections (planes including the X-axis and Y-axis shown in FIG. 2) of the respective slits 16 and 17, flowing into the laminating portion 18, are laminated alternately in the laminating portion 18, to form layer streams. The layer streams flow down in the discharge path 19. The lamination direction of the molten resin A and the molten resin B in the layer streams flowing down in the discharge path 19 agree with the thickness direction of the laminated sheet produced.

The layer streams flowing down in the discharge path 19 are introduced through the conduit pipe 4 shown in FIG. 1 into the die 5. The layer streams are widened in the predetermined direction (the direction perpendicular to the lamination direction of the molten resin A and the molten resin B) in the die 5, and are discharged as a laminated sheet 6 from the die 5. The discharged laminated sheet 6 is cooled and solidified on the surface of the casting drum 7, and is sent as an un-drawn film 8 to the subsequent step (for example, drawing step), being formed as a multilayer film (not shown in the drawing).

Figure 4:
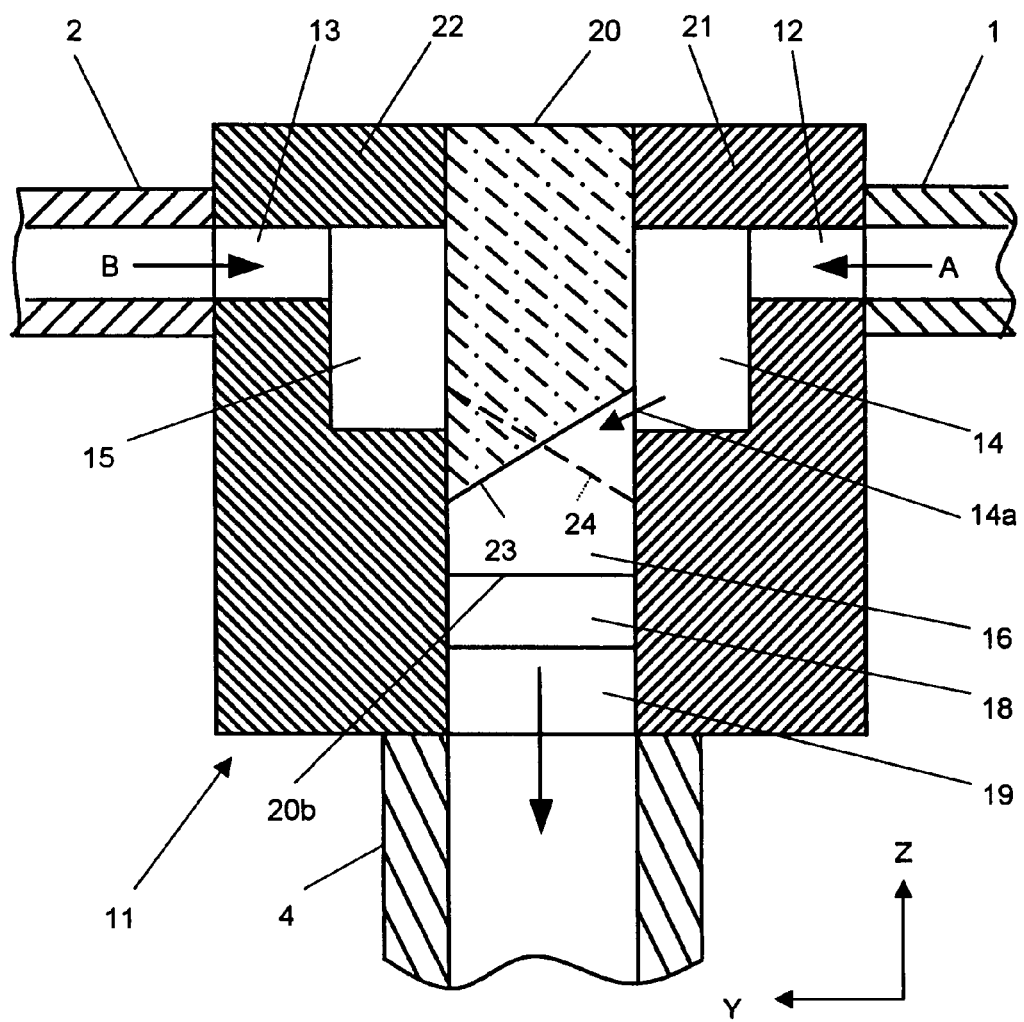
FIG. 4 is a cross sectional arrow view along line S1-S1 of FIG. 3.
Figure 5:
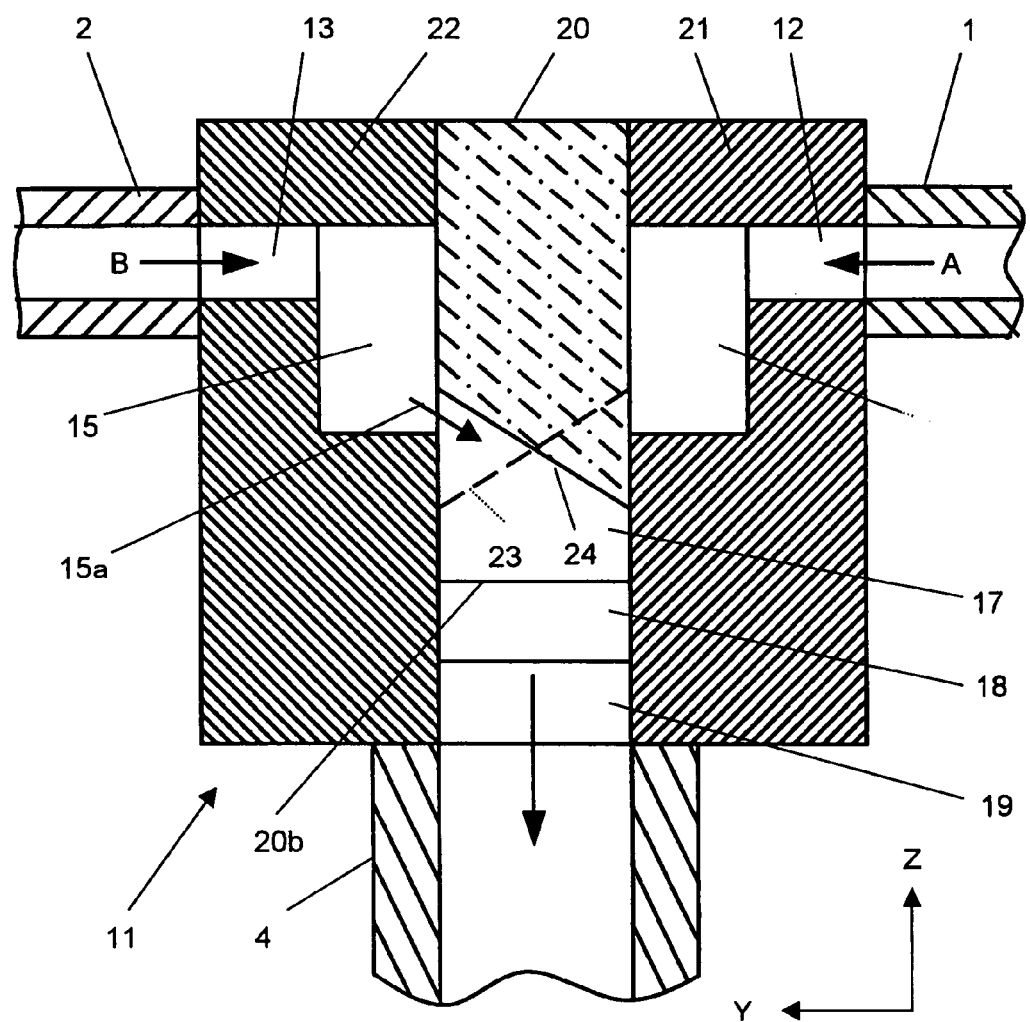
FIG. 5 is a cross sectional arrow view along line S2-S2 of FIG. 3.

FIGS. 4 and 5 show the relation between one of the slits 16 and one of the slits 17 positioned adjacently to each other respectively through the partition wall 20b in the longitudinal direction of the slit plate 20, as expanded views.

On the top side of each slit 16 or 17, that is, on the upstream section of the second flow path portion described later, an inclined section 23 or 24 inclined more downward in the downstream direction of the molten resin flow as it leaves from the corresponding manifold 14 or 15 is formed respectively. The inclined section 23 or 24 is formed as an inclined section extending straight in this example. The inclined sections 23 and 24 are inclined in the directions reverse to each other, as shown in FIGS. 4 and 5.

In the multilayer feed block 11, the molten resin A flows into each slit 16 having the inclined section 23 from the manifold 14 as indicated by arrow 14a in FIG. 4. Furthermore, the molten resin B flows into each slit 17 having the inclined section 24 from the manifold 15 as indicated by arrow 15a in FIG. 5.

The inclined section 23 is used in such a manner that the top of the slit 16 builds the flow path of the molten resin A formed to communicate with the manifold 14 only, and the inclined section 24 is used in such a manner that the top of the slit 17 builds the flow path of the molten resin B formed to communicate with the manifold 15 only.

Figure 6:
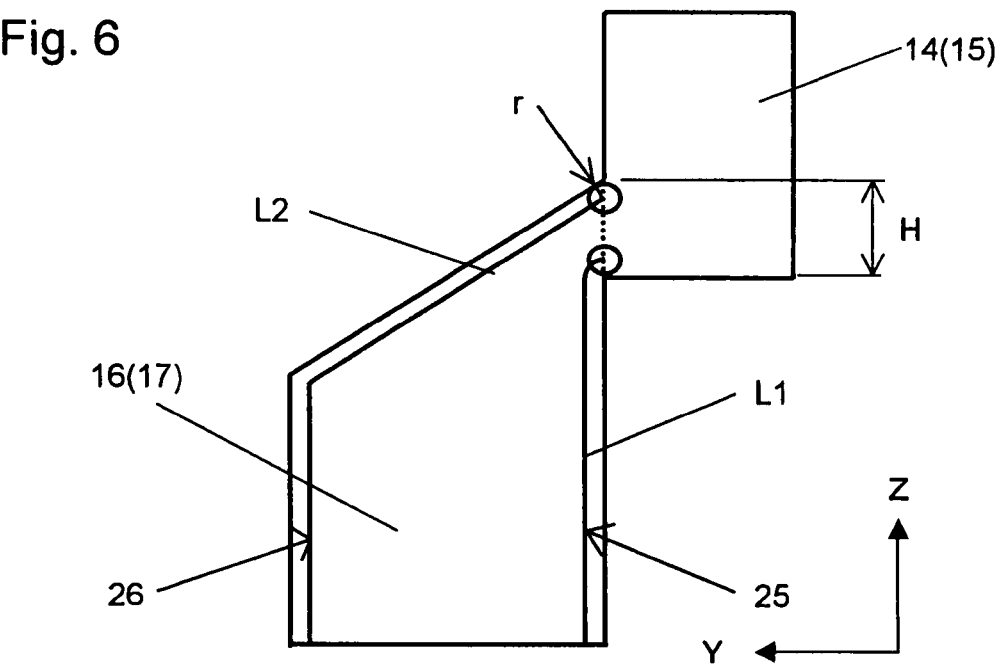
FIG. 6 is a drawing for explaining the flow path of a molten resin in the slit shown in FIG. 4 or 5.

In the first embodiment of the laminated sheet production apparatus of the invention, in each of the slits 16 forming one group of slits concerned with the molten resin A, as shown in FIG. 6, in the slit width direction (Y-axis direction shown in FIG. 6) in the flow path from the outlet of the corresponding manifold 14 (the inlet of the slit 16) to the outlet of the slit 16, the ratio L1/L2 of the flow path length L1 of the first flow path portion 25 running on the side near the manifold 14 to the flow path length L2 of the second flow path portion 26 running on the side far from the manifold 14 is set at 0.5 or more, preferably 0.55 or more.

Moreover, each of the slits 17 forming the other group of slits concerned with the molten resin B is also set in the same relation as shown in FIG. 6. This relation is not shown in the drawing, but is the mirror image of the relation shown in FIG. 6.

The sizes of the respective slits 16 and 17 and the forms of the inclined sections are decided to satisfy this relation.

Figure 13:
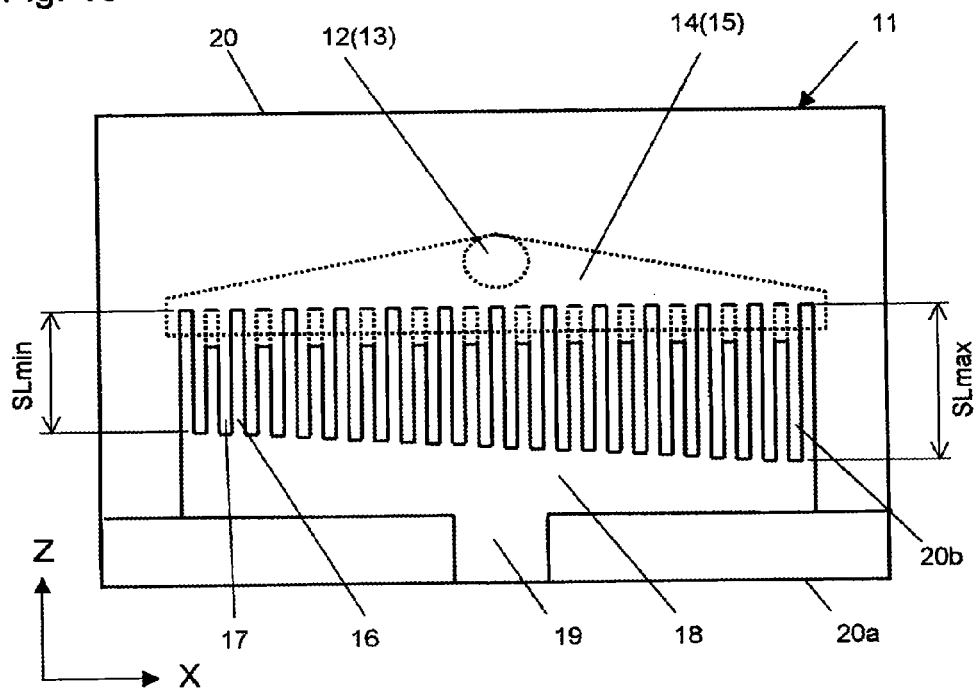
FIG. 13 is a front view showing another example of the slit plate of the invention.

FIG. 13 is a drawing relating to a multilayer feed block used in an example of the second embodiment of the laminated sheet production apparatus of the invention. The basic structure of the multilayer feed block 11 shown in FIG. 13 is the same as the basic structure of the multilayer feed block 11 shown in FIG. 3. Therefore, the same parts numbers are used.

A difference between the multilayer feed block 11 of FIG. 13 and the multilayer feed block 11 of FIG. 3 is that the slit lengths of the arranged slits 16 and 17 are irregular in the multilayer feed block 11 of FIG. 13. The slit plate having irregular slit lengths is not required to have the inclined sections 23 and 24 shown in FIGS. 4 and 5. However, in this example, a multilayer feed block having inclined sections as shown in FIG. 13, like the multilayer feed block 11 of FIG. 3, is used for explanation.

In FIG. 13, the slit lengths SL of the numerous slits 16 and 17 alternately formed respectively through the partition wall 20b in the slit plate 20 are formed to change monotonously like a straight line from one end to the other end in the arranged direction of slits 16 and 17 (X-axis direction shown in FIG. 13). That is, they are formed in such a manner that the slit at one end has the shortest slit length SLmin and that the slit at the other end has the longest slit length SLmax. A slit length SL refers to the length of a slit in the vertical direction (Z-axis direction shown in FIG. 13). In the case where the top of the slit is inclined, the slit length refers to the length of the slit in the vertical direction (Z-axis direction shown in FIG. 13) at the central position of the slit width. In the example of FIG. 13, the slit gaps of all the slits are assumed to be substantially the same.

The multilayer feed block 11 having the slit plate 20 in which the slit lengths of the respective slits 16 and 17 are set to change monotonously from one end to the other end as shown in FIG. 13 is used as the multilayer feed block 11 of the laminated sheet production apparatus shown in FIG. 1. A transverse sectional view showing an example of the laminated sheet (multilayer film) produced using this laminated sheet production apparatus is shown in FIG. 14.

Figure 14:
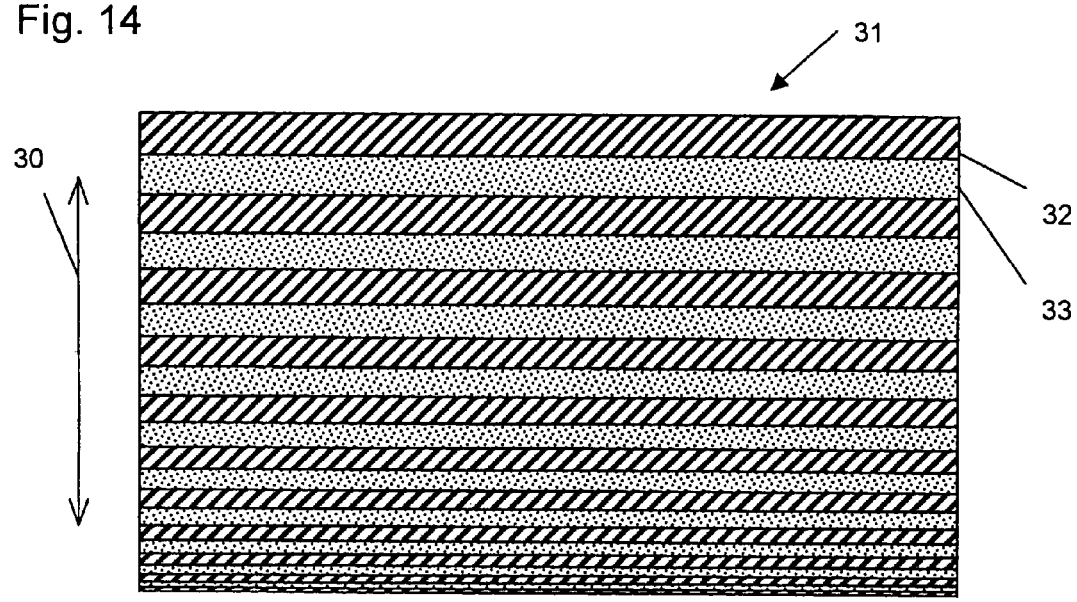
FIG. 14 is a transverse sectional view of a laminated sheet produced using the slit plate of the invention of FIG. 13.

In FIG. 14, a laminated sheet 31 has a structure in which layers 32 composed of resin A and layers 33 composed of resin B are laminated alternately. A feature of this structure is such that the thicknesses of the layers 32 and 33 gradually decrease or increase from one surface to the other surface of the laminated sheet 31, that is, in the thickness direction of the laminated sheet (arrow 30 shown in FIG. 14).

Figure 15:
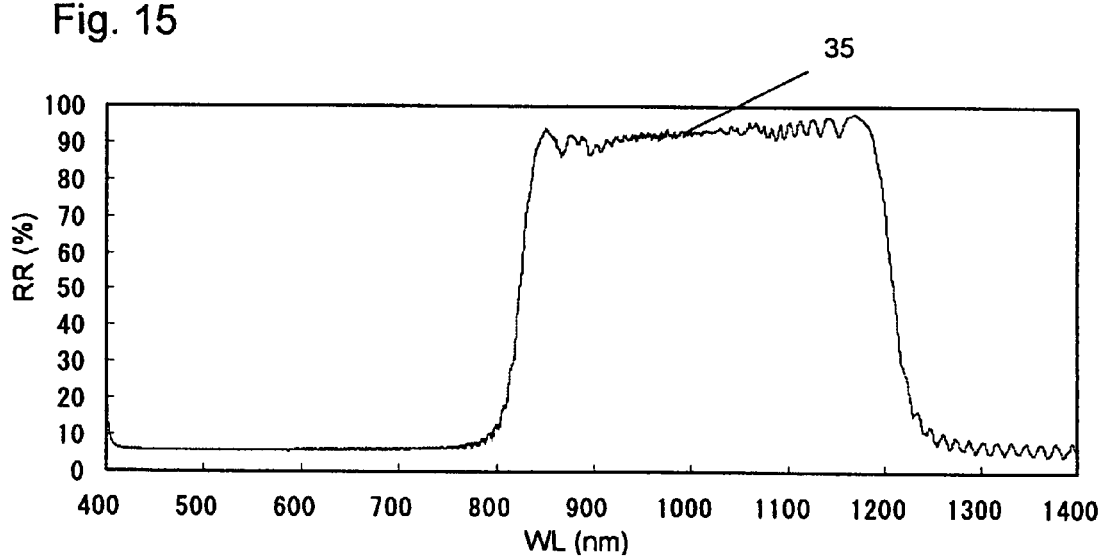
FIG. 15 is a graph showing the optical characteristics of the laminated sheet of FIG. 14 as the relation between the wavelength and the reflectance of light.

The laminated sheet (multilayer film) 31 successively changing in layer thickness has a clearly sectioned reflectance region 35 to broad-band wavelengths, for example as shown in FIG. 15, and shows peculiar optical characteristics. Therefore, the laminated sheet (multilayer film) 31 can be used as an interference reflection film capable of reflecting or transmitting light with a broad-band wavelength using optical interference. Meanwhile, in the wavelength vs. reflectance graph of FIG. 15, the wavelength WL (nm) is chosen as the abscissa, and the reflectance RR (%), as the ordinate.

Figure 18:
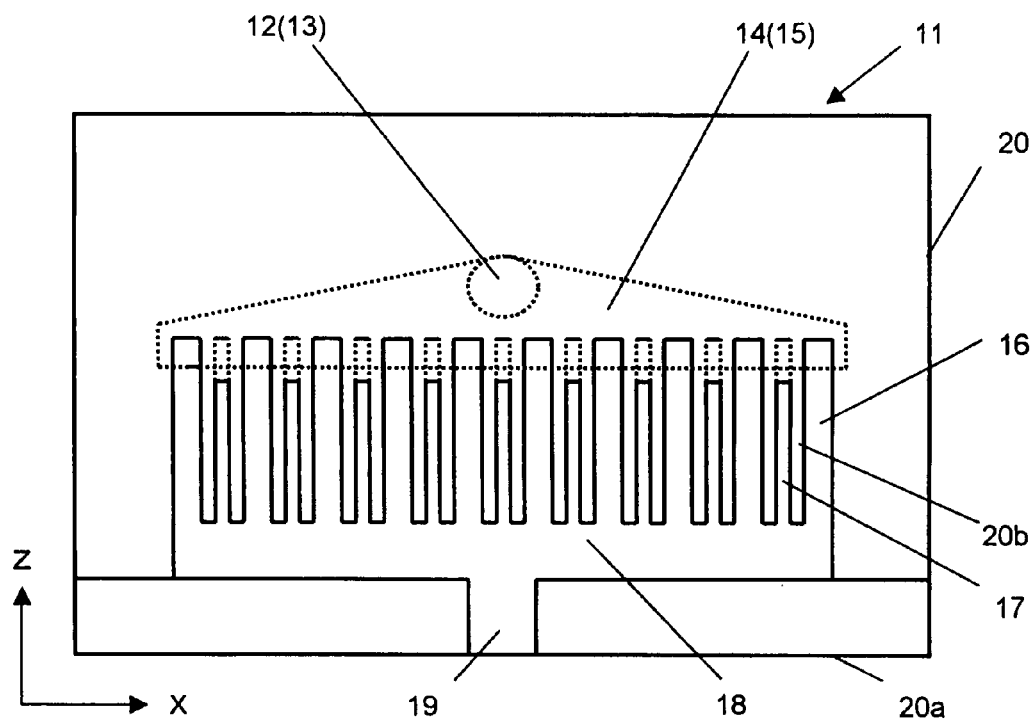
FIG. 18 is a front view showing a further other example of the slit plate of the invention.

FIG. 18 is a drawing relating to a multilayer feed block used in an example of the third embodiment of the laminated sheet production apparatus of the invention. The basic structure of the multilayer feed block 11 shown in FIG. 18 is the same as the basic structure of the multilayer feed block 11 shown in FIG. 3. Therefore, the same parts numbers are used.

A difference between the multilayer feed block 11 of FIG. 18 and the multilayer feed block 11 of FIG. 3 is that the flow rates of the molten materials in the arranged slits 16 and 17 can be changed to ensure that the thicknesses of any desired layers or the thicknesses of all the layers can have the intended values (design values) based on the layer thickness information obtained by measuring the thicknesses of the layers of the laminated sheet molded using the multilayer feed block 11. Meanwhile, the slit plate 20 in the multilayer feed block 11 of FIG. 18 is not required to have the inclined sections 23 and 24 shown in FIGS. 4 and 5. However, in this example, a multilayer feed block having the inclined sections as shown in FIG. 18, like the multilayer feed block 11 of FIG. 3, is used for explanation.

Particular means for changing the flow rates of molten materials include the change of slit gaps, change of slit lengths and change of the temperatures of the molten resins flowing in the slits.

Figure 19:
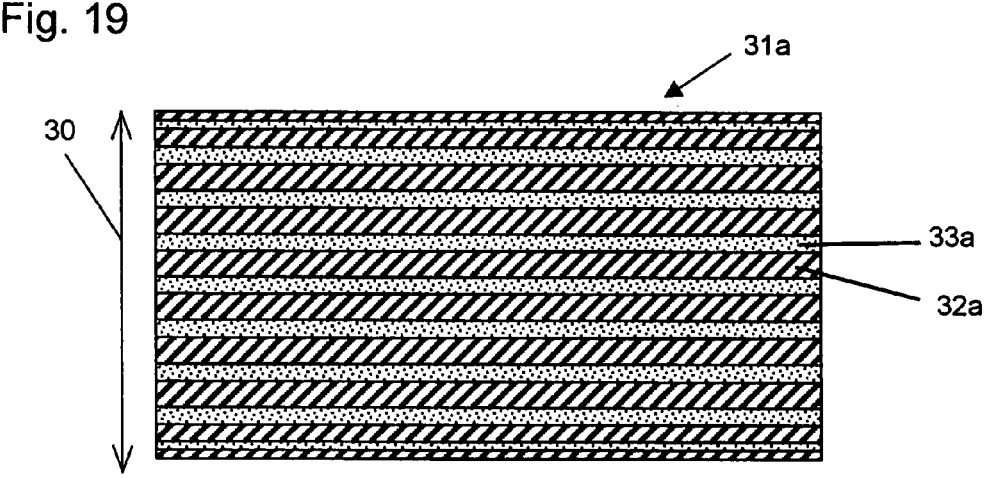
FIG. 19 is a transverse sectional view showing the laminated sheet produced using the slit plate of the invention of FIG. 18.

FIG. 19 shows a transverse sectional view of a laminated sheet obtained using the multilayer feed block 11 of FIG. 18. In the laminated sheet 31a of FIG. 19, layers 32a composed of resin A and layers 33a composed of resin B are alternately laminated. In this case, as explained before as a problem of the conventional multilayer feed block, the layers closer to the surface layers of the multilayer film tend to be smaller in thickness. This state is shown in the multilayer film 31a of FIG. 19. In the case where it is required that the thicknesses of the respective layers in the film thickness direction (arrow 30 shown in FIG. 19) are the same as a design target of the multilayer film 31a, a multilayer film 31a consisting of layers different from each other in thickness is defective.

Figure 20:
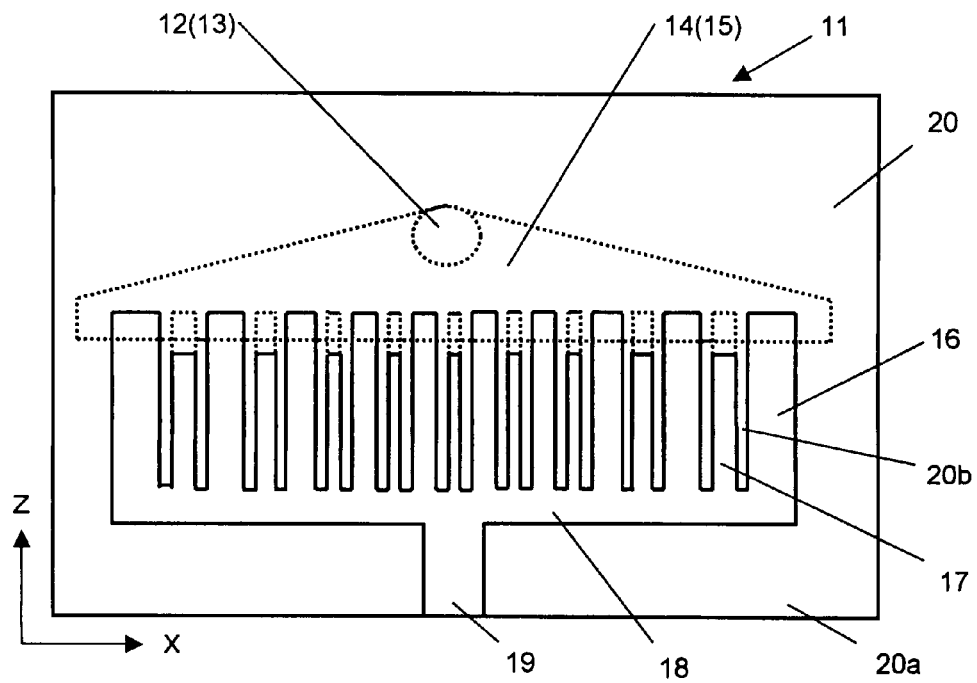
FIG. 20 is a front view showing the slit plate obtained by changing the slit gaps of the slit plate of FIG. 18 based on the lamination state of layers shown in FIG. 19.

The multilayer feed block 11 shown in FIG. 20 solves this problem. In the slits 16 and 17 alternately arranged respectively through the partition wall 20b in the slit plate 20 of the multilayer feed block 11 of FIG. 20, the slit gaps corresponding to the layers positioned on the surface sides of the multilayer film 31a are changed to be larger. The slit gaps are changed based on the layer thickness information obtained by measuring the thicknesses of the respective layers of the laminated sheet 31a shown in FIG. 19.

With regard to the change, the dimensions of the slits of the slit plate 20 in the multilayer feed block 11 can be changed by mechanical or thermal means installed in the multilayer feed block 11 based on the layer thickness information obtained by measuring the thicknesses of the respective layers of the laminated sheet. In this case, the layer thicknesses can be automatically measured, and the signals based on the measured data can be fed back to the mechanical or thermal means, for automatically actuating the mechanical or thermal means based on the signals, to automatically change the dimensions of the slits. Furthermore, the change can also be performed by replacing the slit plate 20 shown in FIG. 18 by the slit plate 20 having changed slit gaps shown in FIG. 20 in the multilayer feed block 11 based on the layer thickness information obtained by measuring the thicknesses of the respective layers of the laminated sheet.

Figure 21:
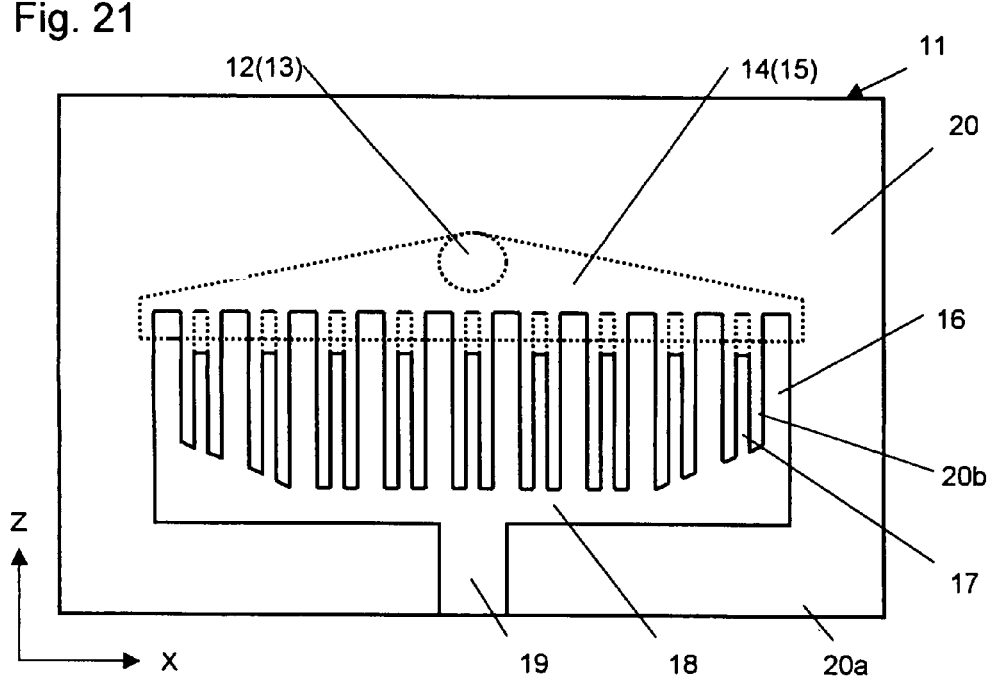
FIG. 21 is a front view showing a further other example of the slit plate of the invention.

The multilayer feed block 11 shown in FIG. 21 solves the above-mentioned problem. The slits 16 and 17 alternately arranged respectively through the partition wall 20b in the slit plate 20 in the multilayer feed block 11 of FIG. 21 are changed to ensure that the slits corresponding to the layers positioned closer to the surfaces of the multilayer film 31*a* are shorter in slit length. The change of slit lengths is performed based on the layer thickness information obtained by measuring the thicknesses of the respective layers of the laminated sheet 31*a* shown in FIG. 19.

Figure 22:
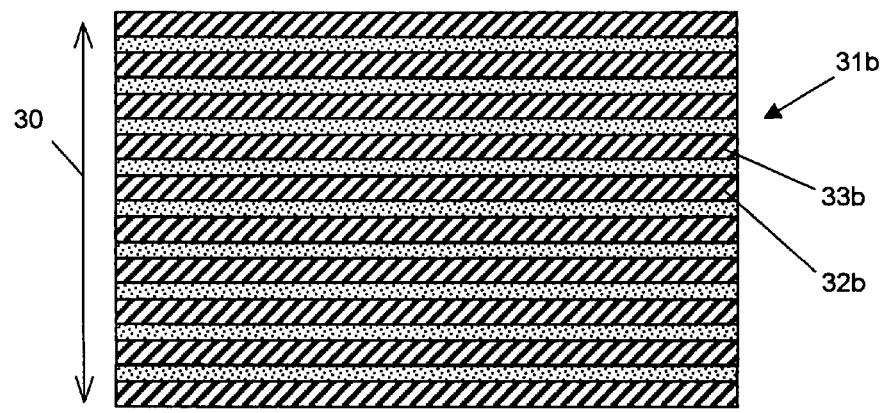
FIG. 22 is a transverse sectional view showing the laminated sheet produced using the slit plate of the invention of FIG. 20 or 21.

The laminated sheet obtained by using the multilayer feed block 11 having the slit plate in which the slit gaps are changed based on the measured results of layer thicknesses as shown in FIG. 20 has, for example, the layer constitution as shown in FIG. 22. That is, the thicknesses of the layers 32*b* composed of the resin A and of the layers 33*b* composed of the resin B of the laminated sheet 31*b* have substantially the same predetermined intended values in the film thickness direction (arrow 30 shown in FIG. 22).

Figure 23:
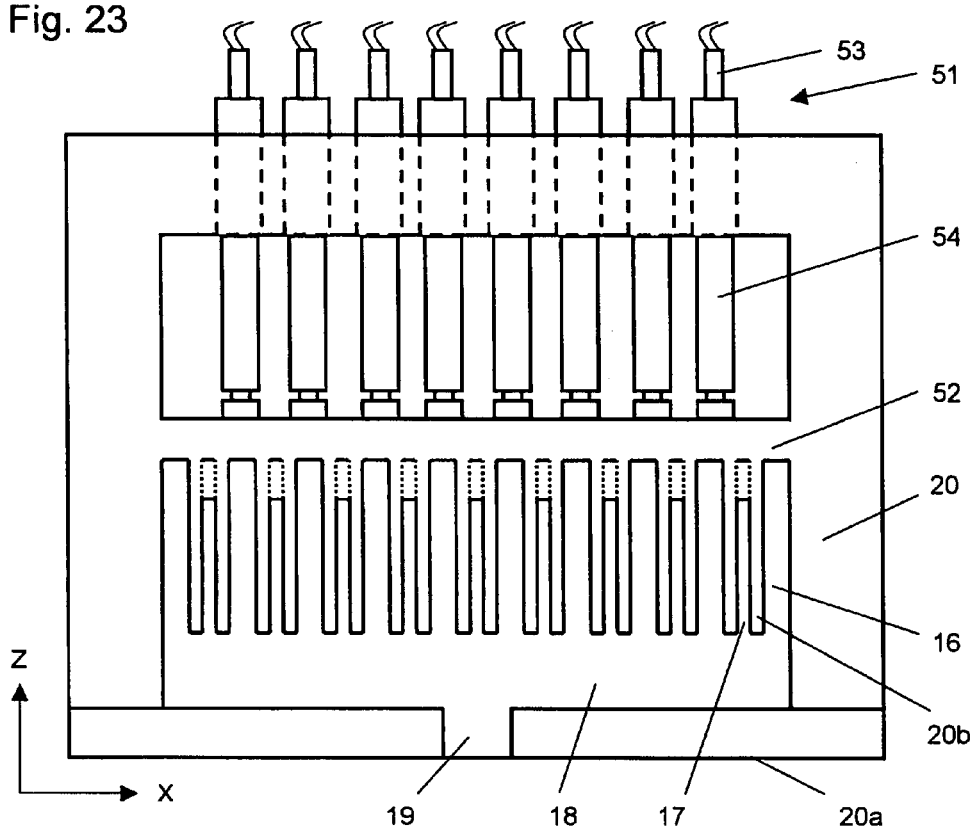
FIG. 23 is a front view showing a further other example of the slit plate of the invention.

The multilayer feed block shown in FIG. 23 can change the flow rates of the molten resins in the slits by a method different from that of the above-mentioned example. In FIG. 23, the multilayer feed block 51 has means for mechanically changing the slit gaps using heat bolts. Above the position where the respective slits 16 and 17 are arranged, a slit gap retaining and deflecting section 52 is provided. On the slit gap retaining and deflecting section 52, numerous heat bolts 54 are arranged with intervals kept between them in the slit arrangement direction, and each of the respective heat bolts 54 is provided with a cartridge heater 53.

Each of the cartridge heaters 53 is turned on and off or changed in temperature to change the expansion or contraction of the corresponding heat bolt 54. The changed expansion or contraction changes the deflection of the slit gap retaining and deflecting section 52. The changed deflection changes the gap of the corresponding slit 16 or 17 in the multilayer feed block 51. Particularly if the heat bolt 54 expands, the slit gap retaining and deflecting section 52 is deflected in the molten resin flow direction, to widen the slit gap. The widening increases the flow rate of the molten resin in the slit. Similarly if the heat bolt 54 contracts, a reverse phenomenon occurs.

Figure 24:
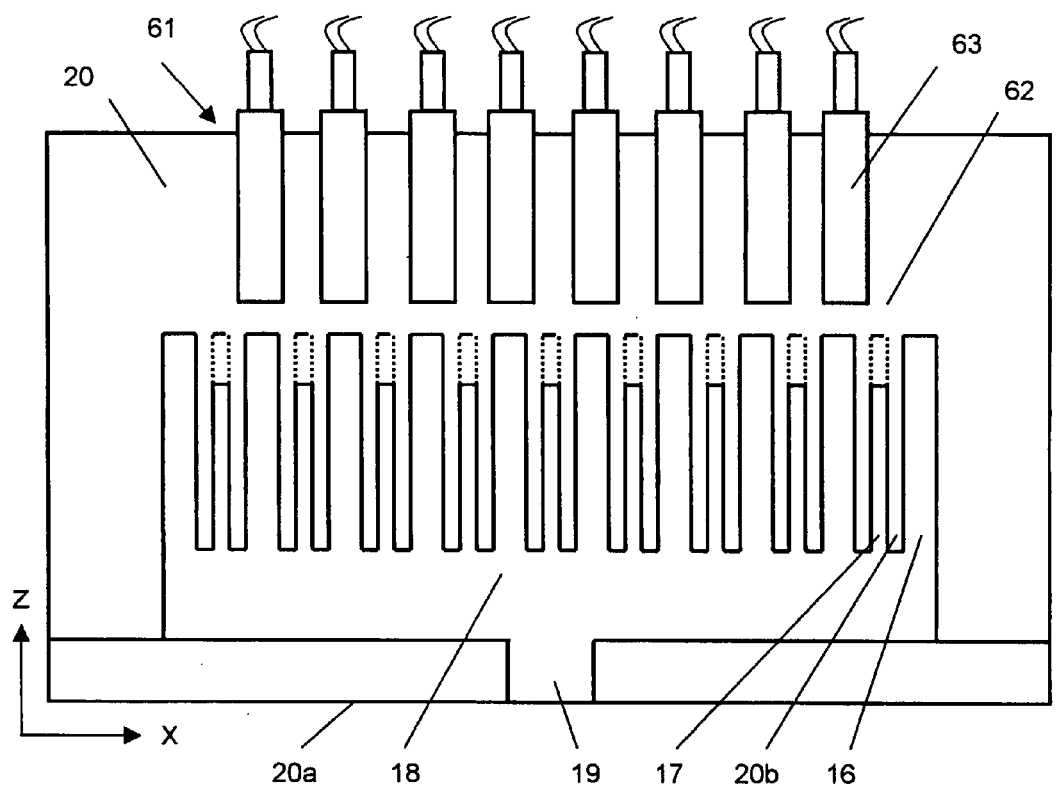
FIG. 24 is a front view showing a further other example of the slit plate of the invention.

The multilayer feed block 61 shown in FIG. 24 has a slit gap retaining and deflecting section 62 for the respective slits 16 and 17 like the multilayer feed block 51 of FIG. 23. However, it does not have the heat bolts 54, but has a structure in which cartridge heaters 63 are arranged with intervals kept between them in the slit arrangement direction and buried in the slit gap retaining and deflecting section 62.

In the multilayer feed block 61, the respective cartridge heaters 63 are used to control temperatures, to thermally control the deflections of the slit retaining and deflecting section 62, to thereby adjust the slit gaps of the respective slits 16 and 17.

According to the multilayer feed block 51 shown in FIG. 23 and the multilayer feed block 61 shown in FIG. 24, while the laminated sheet is molded, the flow rates of the molten resins in the desired slits can be easily and accurately changed.

The laminated sheet production apparatus shown in FIG. 1 having the multilayer feed block 11 shown in FIG. 3 was used to produce a biaxially oriented multilayer film, and the effects of the invention were confirmed. Practical examples showing the effects of the invention are explained with the following Example 1 and Comparative Example 1.

EXAMPLE 1

Figure 7:
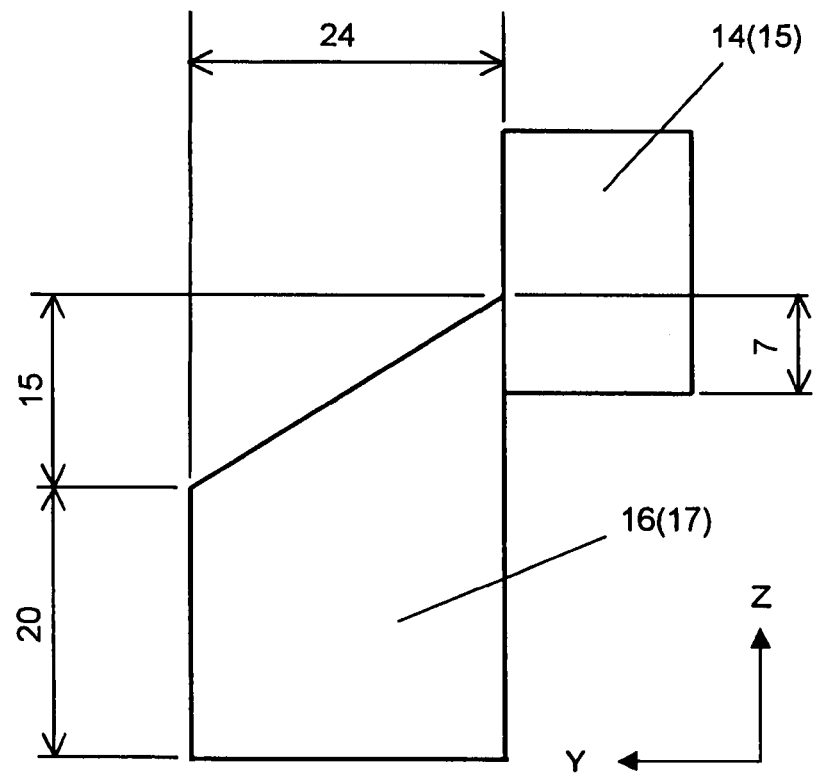
FIG. 7 is a drawing for explaining the dimensional relation between the slit width and the slit length of the slit shown in FIG. 6, used in Example 1.
Figure 8:
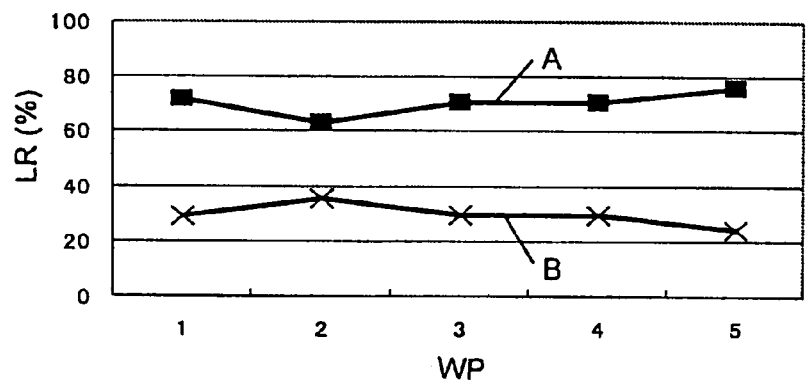
FIG. 8 is a graph showing the distribution of lamination ratios of the resin A and the resin B in the laminated sheet produced based on Example 1, in the width direction of the sheet.

FIG. 7 shows the sizes (in mm) of main portions of the manifold 14 (15) and each of the slits 16 (17) in the multilayer feed block 11 used in the test. FIG. 8 shows the distributions of lamination ratios of the resin A and the resin B in the width direction of the produced multilayer film. In the graph of FIG. 8, the position in the width direction WP is chosen as the abscissa, and the lamination ratio LR (%), as the ordinate. The slit gap of the slit 16 passing through the resin A was 0.7 mm, and the slit gap of the slit 17 passing through the resin B was 0.55 mm.

Comparative Example 1

Figure 9:
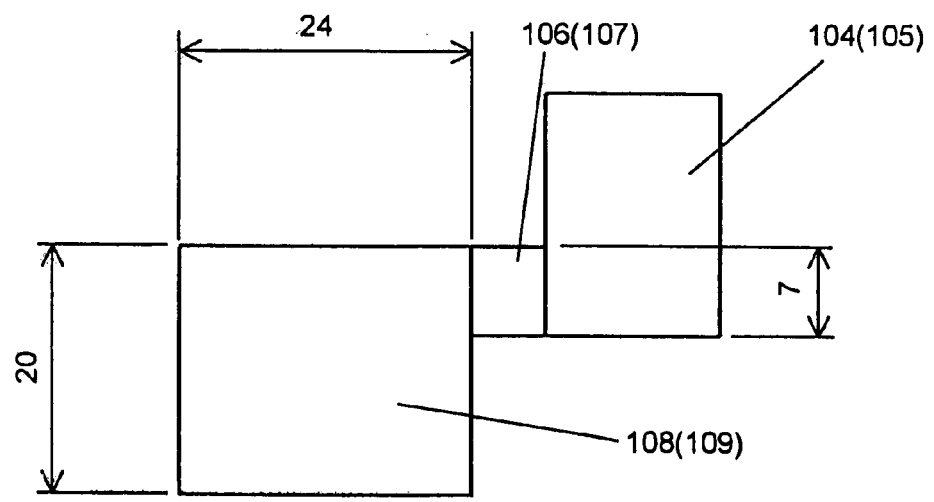
FIG. 9 is a drawing for explaining the dimensional relation between the slit width and the slit length of the slit shown in FIG. 12, used in Comparative Example 1.
Figure 10:
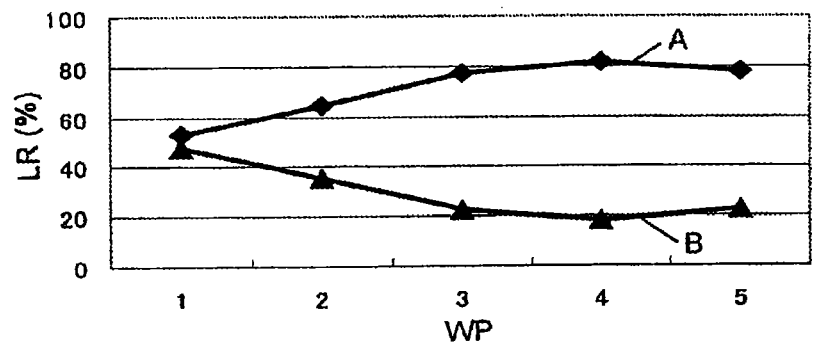
FIG. 10 is a graph showing the distribution of the lamination ratios of the resin A and the resin B of the laminated sheet produced based on Comparative Example 1, in the width direction of the sheet.
Figure 11:
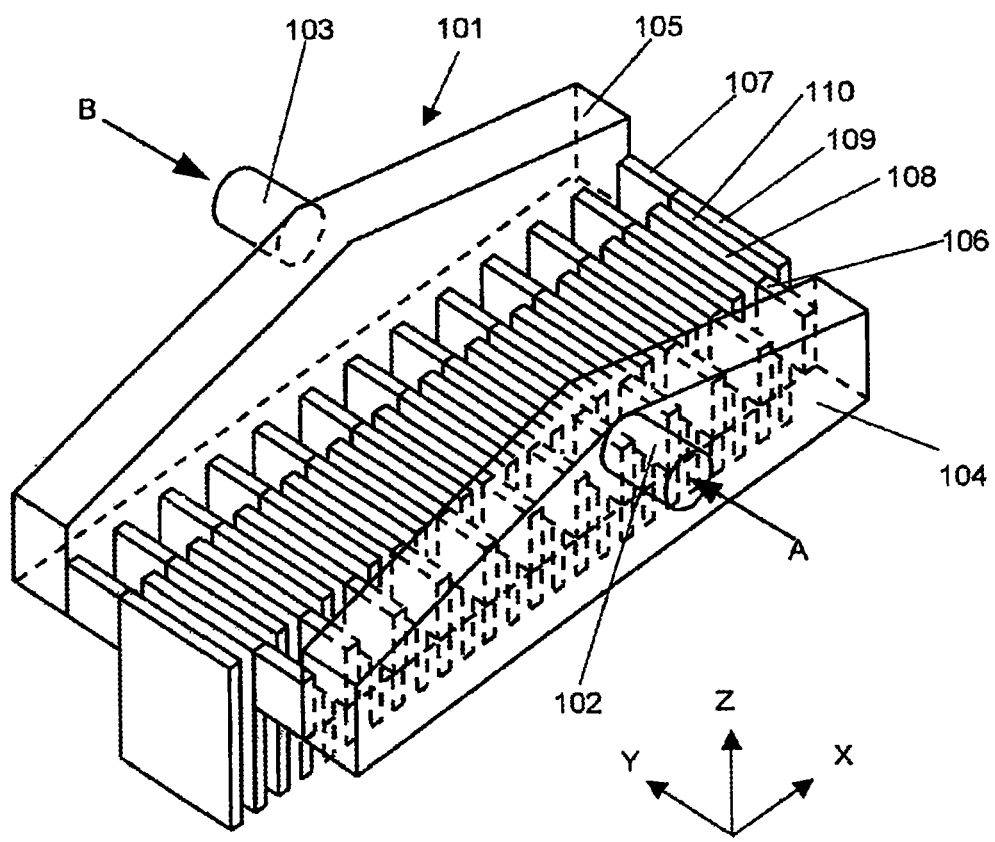
FIG. 11 is an exploded perspective view showing the inside spaces in the multilayer feed block used in the conventional laminated sheet production apparatus.

FIG. 9 shows the sizes (in mm) of main portions of the manifold 104 (105) and each of the slits 108 (109) in the multilayer feed block of the conventional structure used in the test conducted for comparison. A tiny hole 106 (107) exists between the manifold 104 (105) and the slit 108 (109). FIG. 10 shows the distributions of lamination ratios of the resin A and the resin B in the width direction of the produced multilayer film. In the graph of FIG. 10, the position in the width direction WP is chosen as the abscissa, and the lamination ratio LR (%), as the ordinate. The slit gap of the slit 16 passing through the resin A was 0.7 mm, and the slit gap of the slit 17 passing through the resin B was 0.55 mm.

Figure 12:
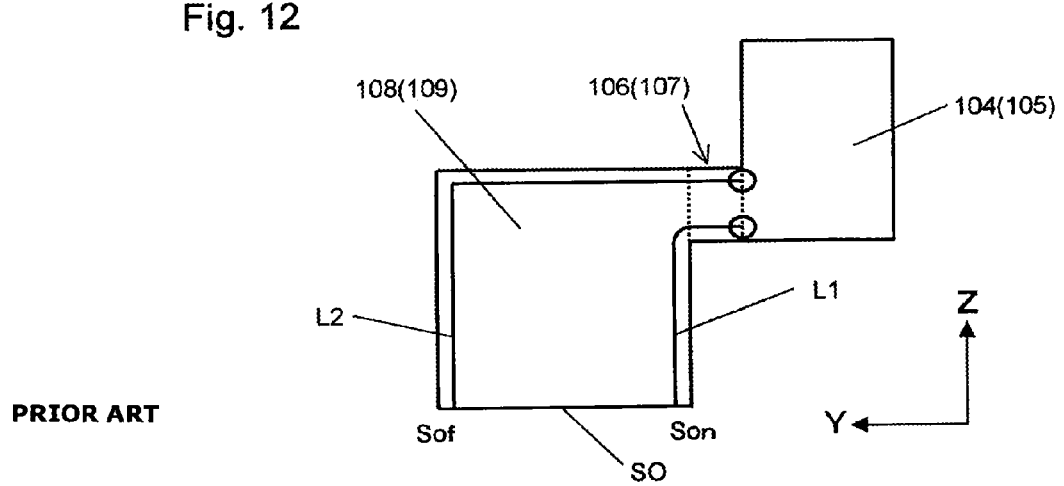
FIG. 12 is a drawing for explaining the flow path of a molten resin in each of the slits of the conventional multilayer feed block shown in FIG. 11.

The flow path length L1 of the first flow path portion and the flow path length L2 of the second flow path portion in the slit 16 (17) are defined as shown in FIG. 6 and FIG. 12. That is, if a circle with a diameter corresponding to $\frac{1}{10}$ of the inlet length H of the slit (radius=r) is rolled from the outlet of the manifold along the inner wall face of the slit as the first flow path portion running on the side near the manifold, the length of the moving locus of the center of the circle is defined as the flow path length L1 of the first flow path portion. Furthermore, if the same circle is similarly rolled along the inner wall face of the slit as the second flow path portion on the side far from the manifold, the length of the moving locus of the center of the circle is defined as the flow path length L2 of the second flow path portion.

In Example 1 and Comparative Example 1, since the inlet length of the slit is 7 mm as shown in FIGS. 7 and 9, the diameter of the circle to be rolled is 0.7 mm, and the radius is 0.35 mm. In Example 1 shown in FIG. 7, L1 was 28.55 mm and L2 was 47.70 mm. Therefore, L1/L2 was 0.598 (about 6). Furthermore, in Comparative Example 1 shown in FIG. 9, L1 was 23.55 mm and L2 was 53.30 mm. Therefore L1/L2 was 0.442.

The lamination ratios R (%) of the resin A and the resin B in the width direction of the film were obtained by measuring the rates of the resin A (polyethylene terephthalate: PET) and the resin B at the respective positions WP in the film width direction as explained below. That is, in the obtained film, about 10 mg each was sampled at positions of equal distances in the width direction from the central position in the film width direction (position in the width direction WP=3 in FIGS. 8 and 10). Each sample was placed on an aluminum plate, and differential scanning calorimeter DSC "RDC220" produced by Seiko Instruments Inc. was used to heat from room temperature up to temperature 300° C. at a rate of 20° C./min, to measure the heat of melting (mJ/mg) of the film in this case. Then, the PET ratio at each position in the width direction was calculated from the following formula (II)

PET ratio (%)=(X/Y)×100    (II)

X: Heat of melting of laminated film (mJ/mg)

Y: Heat of melting of PET film (41.9 mJ/mg)

The graph in FIG. 8 showing the distributions of lamination ratios in Example 1 was prepared based on the measured data shown in shown in Table 1. The lamination ratio irregularity in Example 1 was ±6%.

TABLE 1

| Position in width direction WP | Resin A (%) | Resin B (%) |
| --- | --- | --- |
| 1 | 71.3 | 28.7 |
| 2 | 64.4 | 35.6 |
| 3 | 70.2 | 29.8 |
| 4 | 70.6 | 29.4 |
| 5 | 75.7 | 24.3 |

The graph in FIG. 10 showing the distributions of lamination ratios in Comparative Example 1 was prepared based on the measured data shown in shown in Table 2. The lamination ratio irregularity in Comparative Example 1 was ±14%.

TABLE 2

| Position in width direction WP | Resin A (%) | Resin B (%) |
| --- | --- | --- |
| 1 | 52.7 | 47.3 |
| 2 | 64.7 | 35.3 |
| 3 | 77.5 | 22.5 |
| 4 | 81.5 | 18.5 |
| 5 | 77.7 | 22.3 |

As can be seen from FIGS. 8 and 10 as well as Tables 1 and 2, according to the invention, the uniformity in the lamination ratios of resin A and resin B in the width direction of the laminated film was considerably improved, and the laminated film obtained was homogeneous in the width direction.

The measured values in the following examples were measured by the following methods.

(a) Layer Thicknesses and Number of Layers:

The layer constitution of a film was obtained by observing, using a microscope, a sample of a section cutout using a microtome. That is, a transmission electron microscope (Model HU-12 produced by Hitachi, Ltd.) was used to observe a section of a film at a magnification of 3,000 to 40,000 times, and the section was photographed to measure the layer constitution and the thicknesses of the respective layers. Depending on the combination of used resins, a publicly known dyeing technique could also be used to enhance the contrast, though this was not used in the following Example 2 since a sufficient contrast was obtained.

(b) Reflectance:

An integrating sphere with a diameter of 60 mm (130-0632 produced by Hitachi, Ltd.) and a slant spacer with an angle of 10° were attached to a spectrophotometer (U-3410 Spectrophotometer produced by Hitachi, Ltd.), to measure the reflectance. The band parameter was 2/servo, and the gain was set at 3. The measurement was carried out with the detection speed kept in a range from 187 nm/min to 2,600 nm/min. For obtaining the reference reflectance, the accessory $Al_2O_3$ was used as the standard reflector.

(c) Melt Viscosity:

A flow tester (CFT-500) produced by Shimadzu Corp. was used to measure the melt viscosity at a shear rate of 100 $(s^{-1})$. The die used in this case had a diameter of 1 mm, and the measuring stroke was from 10 to 13. The number of measuring times (n) was 3, and the average value was employed.

(d) Wave-Guide Performance:

The wave-guide performance was measured by confirming photoconductance under the following conditions based on JIS C 6823 (1999) Photoconductance (IEC60793-1-C4).

Light Source: LED
Sample form: 10 cm wide 3 m long
Reference optical fiber: "Super Eska" SH4001 produced by Mitsubishi Rayon Co., Ltd.

EXAMPLE 2

Thermoplastic resin A and thermoplastic resin B were pre-arranged as two resins. The thermoplastic resin A used was polyethylene terephthalate (PET) having a melt viscosity of 180 Pa·s at 280° C. (F20S produced by Toray Industries, Inc.). The thermoplastic resin B used was polyethylene terephthalate having a melt viscosity of 350 Pa·s at 280° C. obtained by copolymerizing with 30 mol %, based on the amount of ethylene glycol, of cyclohexanedimethanol (PE/CHDM·T) (PETG6763 produced by Eastman) The thermoplastic resins A and B were respectively dried before they were supplied into an extruder.

The thermoplastic resins A and B were molten at a temperature of 280° C. in the extruder and respectively fed through a gear pump and a filter, being introduced from respective introducing pipes into a multilayer feed block. The multilayer feed block had 801 slits. The slits had inclined sections at their tops as shown in FIGS. 4 and 5.

As for the dimensions of the slits, the respective slits had slit lengths successively different to form a straight line as shown in FIG. 13 with the ratio of the longest slit length SLmax (29 mm)/the shortest slit length SLmin (20 mm) kept at 1.45, to ensure that when said thermoplastic resins were supplied at a total rate of 200 kg/h, the pressure loss difference was 1.5 MPa, with the layer thickness gradually decreased from the layer of the front surface to the layer of the rear surface of the laminated sheet (multilayer film), to have a front surface layer thickness/rear surface layer thickness ratio of 0.69.

The thermoplastic resin A was supplied into the manifold 14 shown in FIG. 4, and the thermoplastic resin B was supplied into the manifold 15 shown in FIG. 5. The layers of the thermoplastic resin A and the layers of the thermoplastic resin B respectively having passed through the slits 16 or the slits 17 were alternately laminated, to obtain a laminated sheet having layers of the thermoplastic resin A as both the surface layers, with the thickness of each layer gradually increased from one surface toward the other surface.

In this case, the slit gaps and the feed quantities of the respective resins were adjusted to ensure that the thickness ratio between the layer of the thermoplastic resin A and the layer of the thermoplastic resin B adjacent to each other was kept at 0.95. The slit gap of the slit 16 passing through the resin A was 0.5 mm, and the slit gap of the slit 17 passing through the resin B was 0.6 mm, after the adjustment.

The layer streams consisting of 801 layers obtained like this was supplied into the T die 5 and molded into a sheet, and the sheet was quickly cooled and solidified on an electrostatically charged casting drum 7 with the surface temperature kept at 25° C.

The obtained cast film 8 was heated by a group of rolls set at a temperature of 90° C., and while it was quickly heated by radiation heaters from both the surfaces of the film, it was drawn to 3.4 times in the machine direction (longitudinal direction of the film) in a drawing section having a length of 100 mm.

Thereafter, the monoaxially oriented film was treated with corona discharge in air on both the surfaces, so that the surfaces of the film (base film) had wet tension of 55 mN/m. The base film was coated, on each of the treated surfaces, with a coating solution capable of forming a laminated layer of (a polyester resin with a glass transition temperature Tg of 18° C.)/(a polyester resin with a glass transition temperature Tg of 82° C.)/(silica particles with an average particle size of 100 nm), to form a transparent, lubricating and adhesive surface layer each on the surfaces of the base film.

The monoaxially oriented film was introduced into a tenter, and preheated using hot air having a temperature of 110° C., being drawn to 3.7 times in the transverse direction (film width direction). The drawn film was heat-treated as it was using hot air having a temperature of 230° C. in the tenter, and in succession treated for 5% relaxation in the width direction, then gradually cooled to room temperature and subsequently wound.

Figure 16:
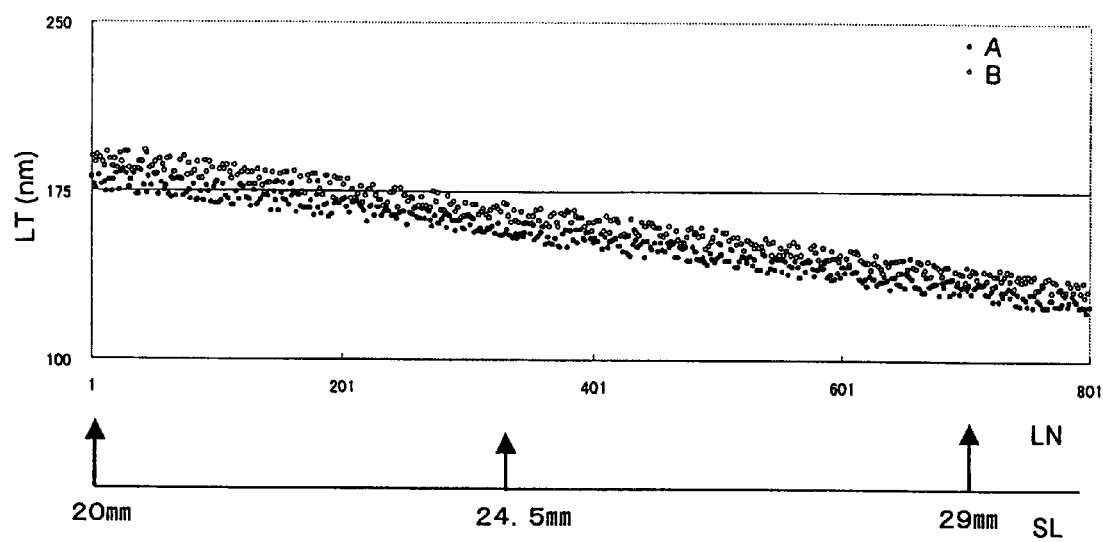
FIG. 16 is a graph showing the layer thickness distribution of the resin A and the resin B in the laminated sheet produced based on Example 2, in relation with the laminated layer numbers and the slit lengths shown in FIG. 13.

The obtained biaxially oriented multilayer film had a total thickness of 125 µm, and as shown by the thicknesses of respective layers in the graph of FIG. 16, it had a lamination structure in which the thicknesses of the layers composed of the thermoplastic resin A showed values gradually decreasing from 180 nm on the front surface side to 125 nm from on the rear surface side, while the thicknesses of the layers composed of the thermoplastic resin B showed values gradually decreasing from 190 nm on the front surface side to 130 nm on the rear surface side. In the graph of FIG. 16, the layer number LN from the front surface of the film (from 1 to 801) and the slit length SL (mm) are chosen as the abscissa, and the layer thickness LT (nm), as the ordinate. In the graph, each closed circle indicates a measured value of the thermoplastic resin A, and each open circle indicates a measured value of the thermoplastic resin B.

Figure 17:
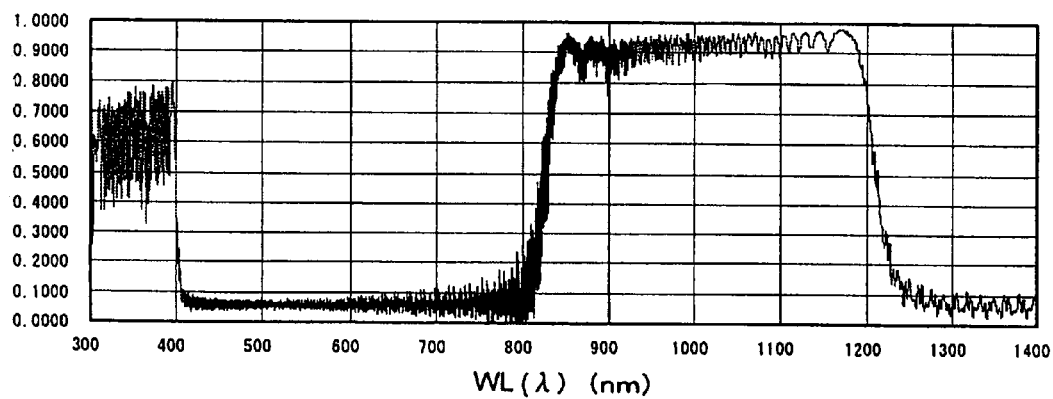
FIG. 17 is a graph showing the optical characteristics of the laminated sheet produced based on Example 2, as the relation between the wavelength and the intensity reflectance of light.

The reflectance values of the film are shown in FIG. 17. As shown in FIG. 17, the film had very high reflectance and wavelength selectivity. On the other hand, even if the film production was continued for one week, neither the run-off of foreign matter due to thermal deterioration nor the film breaking due to foreign matter occurred, and the physical properties of the film did not change either. In the graph of FIG. 17, the wavelength WL ($\lambda$) (nm) is chosen as the abscissa, and the intensity reflectance IR, as the ordinate.

EXAMPLE 3

Figure 25:
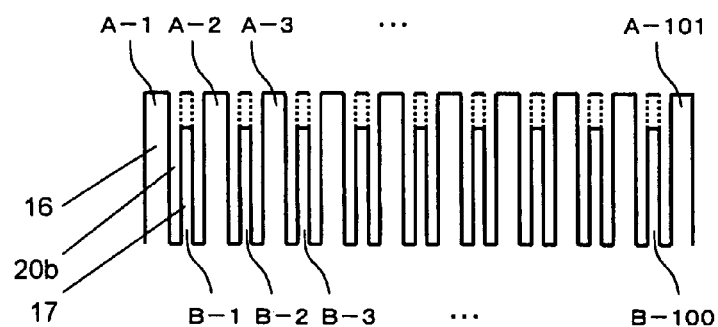
FIG. 25 is a drawing showing the state of the slit gaps of the slits of the slit plate used in Example 3.
Figure 26:
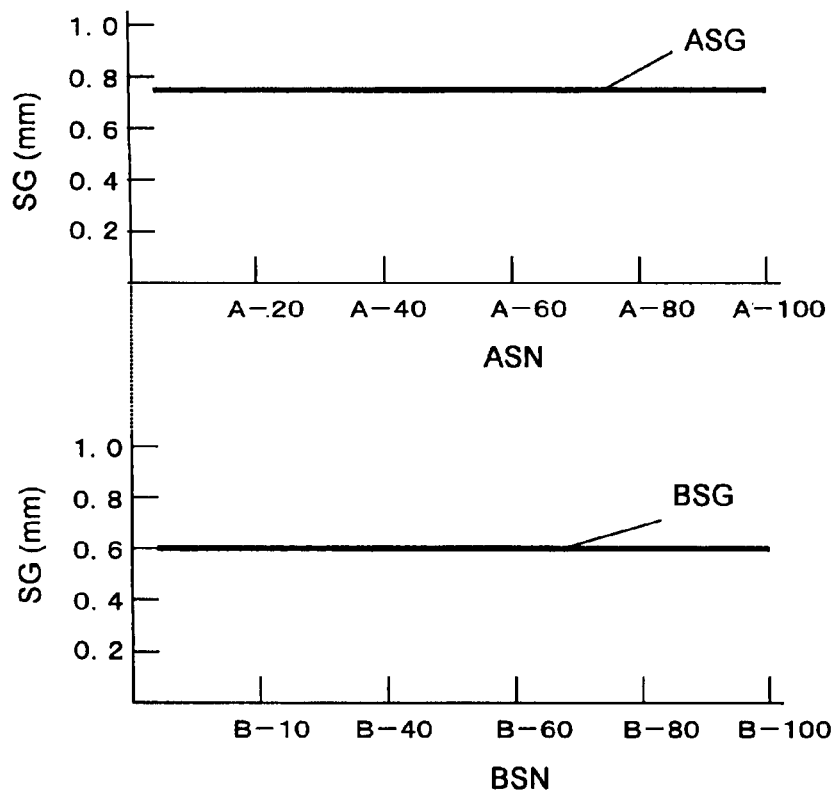
FIG. 26 is a graph showing the distribution state of the slit gaps of the slits which the resin A passed through before the slit gaps were changed in Example 3, in relation with the slit numbers (the top graph of FIG. 26) and a graph showing the distribution state of the slit gaps of the slits which the resin B passed through before the slit gaps were changed in Example 3, in relation with the slit numbers (the bottom graph of FIG. 26).

As the design values of the multilayer film 31b shown in FIG. 22, the following values were employed.
Lamination ratio A/B of resin A to resin B: 2/1,
Total number of layers: 201,
Thickness of each layer of resin A (each layer A): 100 nm, and
Thickness of each layer of resin B (each layer B): 50 nm.
As the design values of the slit plate 20 of the multilayer feed block 11 shown in FIG. 18, the following values were employed for the respective slits 16 (slits A-1 to A-101) which the resin A flowed through, and the respective slits 17 (slits B-1 to B-100) which the resin B flowered through, respectively shown in FIG. 25.
Slit gap of each slit 16 corresponding to each layer A: 0.75 mm,
Slit gap of each slit 17 corresponding to each layer B: 0.6 mm,
Slit width of each slit 16 or 17:24 mm, and
Slit length of each slit 16 or 17:20 mm.
The distribution state of the slit gap values of the slits 16 for the resin A at slits A-1 to A-101 according to the above design values is indicated by line ASG in the top graph of FIG. 26 (FIG. 26A), and the distribution state of the slit gap values of the slits 17 for the resin B at slits B-1 to B-100 according to the above design values is indicated by line BSG in the bottom graph of FIG. 26 (FIG. 26B). In the graph of FIG. 26A, the slit number ASN is chosen as the abscissa, and the slit gap SG (mm), as the ordinate. In the graph of FIG. 26B, the slit number BSN is chosen as the abscissa, and the slit gap SG (mm), as the ordinate.

Figure 27:
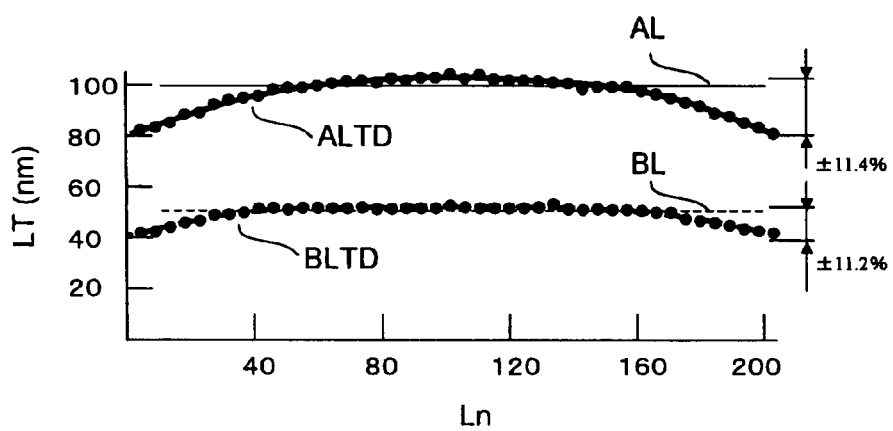
FIG. 27 is a graph showing the distribution of the measured thicknesses of the respective layers composed of the resin A and distribution of the measured thicknesses of the respective layers composed of the resin B in the laminated sheet produced using the slit plate having the distribution state of the slit gaps shown in FIG. 26, together with the distributions of intended thicknesses, in relation with layer numbers.

The multilayer feed block 11 designed as described above was used to produce a multilayer film. A multilayer film having the respective layer thickness distributions shown in FIG. 27 was obtained. In the graph of FIG. 27, the layer number Ln is chosen as the abscissa, and the layer thickness LT (nm) of each layer A or each layer B, as the ordinate. In the graph of FIG. 27, line AL indicates the intended thickness values of the respective layers A distributed in the thickness direction of the multilayer film, and line BL indicates the intended thickness values of the respective layers B distributed in the thickness direction of the multilayer film. Curve ALTD indicates the distribution of the measured thickness values of the respective layers A in the produced multilayer film, and curve BLTD indicates the distribution of the measured thickness values of the respective layers B in the produced multilayer film.

In order to let the thicknesses of the respective layers agree with the design value (intended value) as far as possible based on the measured thickness information of the respective layers A and the respective layers B of the produced multilayer film shown in FIG. 27, the dimension values of the respective slits for correction were obtained by calculation using the relation shown in the following formula (I).

$$Ta(x)/T(x)=[La(x)/L(x)]\times[d(x)^3/da(x)^3] \qquad (I)$$

where T(x) is the measured thickness value of layer x (present thickness of layer x); d(x) is the slit gap of the slit corresponding to the measured thickness value of layer x; L(x) is the slit length of the slit corresponding to the measured thickness value of layer x; Ta(x) is the intended thickness of layer x; da(x) is the slit gap of the slit corresponding to the intended thickness of layer x; and La(x) is the slit length of the slit corresponding to the intended thickness of layer x.

Figure 28:
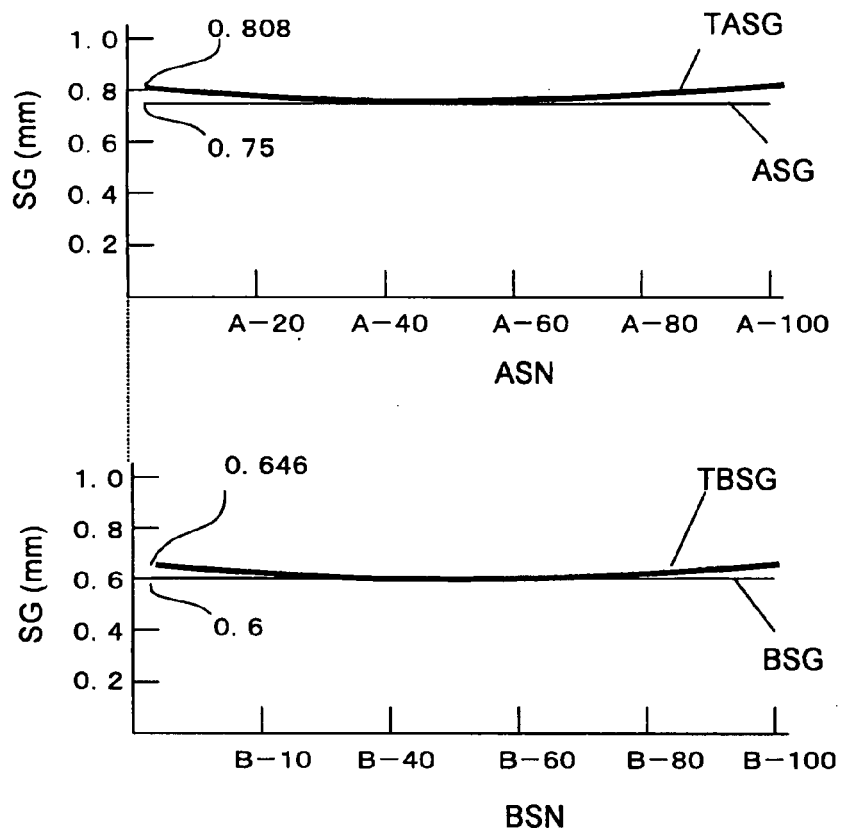
FIG. 28 is a graph showing the distribution state of the slit gaps of the slits which the resin A passed through after the slit gaps were changed in Example 3, in relation with slit numbers (the top graph of FIG. 28) and a graph showing the distribution state of the slit gaps of the slits which the resin B passed through after the slit gaps were changed in Example 3, in relation with slit numbers (the bottom graph of FIG. 28).

Based on the values obtained by calculation from formula (I), the initial slit gaps of respective slits were changed. The distribution state of the values obtained for correction, i.e., the intended slit gap values of the slits 16 for the resin A at slits A-1 to A-101 is expressed by line TASG in the top graph of FIG. 28 (FIG. 28A), and the distribution state of the values obtained for correction, i.e., the intended slit gap values of the slits 17 for the resin B at slits B-1 to B-100 is expressed by line TBSG in the bottom graph of FIG. 28 (FIG. 28B). The graphs of FIG. 28 correspond to the graphs of FIG. 26, and FIG. 28 also shows the lines ASG and BSG of FIG. 26.

Figure 29:
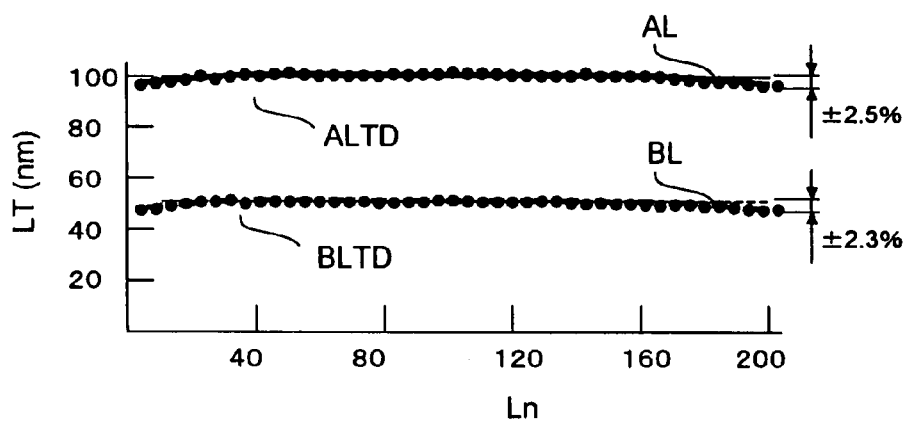
FIG. 29 is a graph showing the distribution of the measured thicknesses of the respective layers composed of the resin A and the distribution of the measured thicknesses of the respective layers composed of the resin B in the laminated sheet produced using the slit plate having the distribution state of slit gaps shown in FIG. 28, together with the distributions of intended thicknesses, in relation with layer numbers.

A slit plate 20 having the dimensions obtained for correction was used to produce a multilayer film. The layer thickness distributions of the obtained multilayer film, ALTD and BLTD, were remarkably improved as shown in FIG. 29 and both the layers A and the layers B showed virtually uniform thickness distributions, indicating that an intended multilayer film was obtained. The graph of FIG. 29 corresponds to the graph of FIG. 27.

The above mainly explains the results of Example 3. The particular method for producing the multilayer film of Example 3 was as follows.
Resin A: Polyethylene terephthalate (PET) resin (thermoplastic resin F20S produced by Toray Industries, Inc.)
Resin B: Cyclohexanedimethanol-copolymerized PET (thermoplastic resin PETG6763 produced by Eastman)
Supply of resins: The respective resins were dried and supplied into an extruder. The temperature of the molten resins in the extruder was set at 280° C. Both the resins were respectively fed through a gear pump and a filter and were supplied into a multilayer feed block 11 for forming 201 layers, for being laminated to form a laminated sheet composed of the resins A and B.

Multilayer feed block: From the slits 16 and 17 (machining accuracy 0.01 mm) corresponding to 101 layers A and 100 layers B, the molten resins were discharged to form a laminated sheet with a lamination ratio of the molten resin A to the molten resin B of A:B=2:1 and having layers A as both the surface layers.

Discharge of laminated sheet: The obtained layer streams of the molten resins were supplied into the T die 5 shown in FIG. 1 and molded into a sheet, and the sheet was quickly cooled and solidified on an electrostatically charged (DC voltage 8 kV) casting drum 7 with a surface temperature of 25° C.

Surface treatment of laminated sheet: The cast film 8 was treated on both the surfaces with corona discharge in air, so that the surfaces of the film (base film) had wet tension of 55 mN/m. The film was coated, on the treated surfaces, with a coating solution capable of forming a laminated layer of (a polyester resin with a glass transition temperature Tg of 18° C.)/(a polyester resin with a glass transition temperature Tg of 82° C.)/(silica particles with an average particle size of 100 nm), to form a transparent, lubricating and adhesive surface layer each on the surfaces of the base film.

Heat treatment of laminated sheet: The surface-treated laminated sheet was introduced into a biaxially drawing machine, and preheated using hot air having a temperature of 95° C., then being drawn to 3.5 times in the machine direction (the longitudinal direction of the film) and in the transverse direction (the width direction of the film). It was further heat-treated using hot air having a temperature of 230° C. and simultaneously treated for 5% relaxation in the machine direction, and in succession treated for 5% relaxation also in the transverse direction, being gradually cooled to room temperature and subsequently wound.

Produced multilayer film: The obtained multilayer film had a thickness of 14.8 μm and showed the primary reflection peak at a wavelength of 488 nm, having a reflectance of 95%. Since it little showed the secondary reflection peak, it was an excellent multilayer film little showing the unwanted reflection in the ultraviolet region.

EXAMPLE 4

As design values of the multilayer film 31*b* shown in FIG. 22, the following values were employed.

Lamination ratio A/B of resin A to resin B: 0.95/1,
Total number of layers: 601,
Thicknesses of respective layers of resin A (respective layers A): Thicknesses monotonously changing from 170 nm to 135 nm, and
Thicknesses of respective layers of resin B (respective layers B): Thicknesses monotonously changing from 180 nm to 145 nm.

Figure 30:
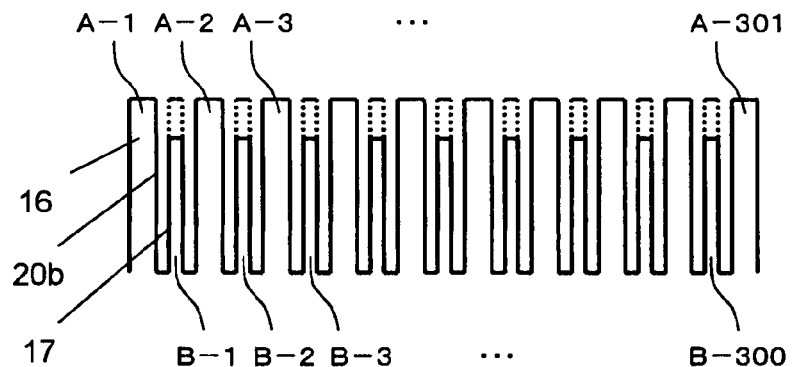
FIG. 30 is a drawing showing the state of the slit gaps of the respective slits of the slit plate used in Example 4.

As the design values of the slit plate 20 of the multilayer feed block 11 shown in FIG. 18, the following values were employed for the respective slits 16 (slits A-1 to A-301) which the resin A flowed through, and the respective slits 17 (slits B-1 to B-300) which the resin B flowed through, shown in FIG. 30.

Slit gaps of respective slits 16 for respective layers A: Gaps monotonously changing from 4.91 mm to 4.55 mm, and
Slit gaps of respective slits 17 for respective layers B: Gaps monotonously changing from 5.00 mm to 4.65 mm.

Figure 31:
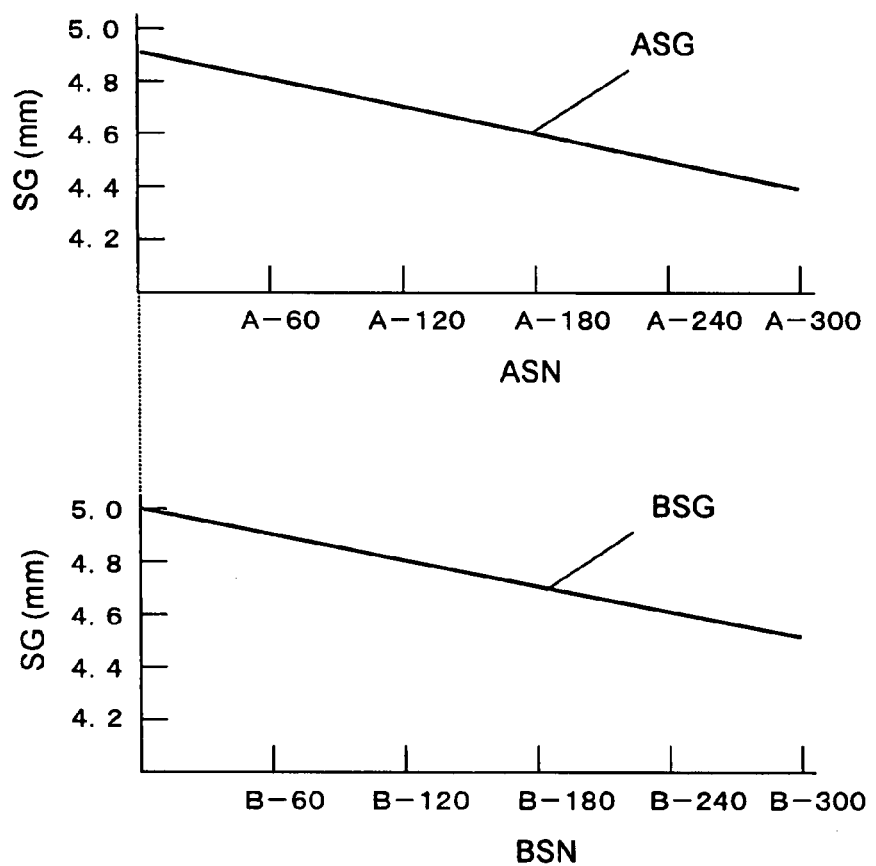
FIG. 31 is a graph showing the distribution state of the slit gaps of the slits which the resin A passed through before the slit gaps were changed in Example 4, in relation with slit numbers (the top graph of FIG. 31), and a graph showing the distribution state of the slit gaps of the slits which the resin B passed through before the slit gaps were changed in Example 4, in relation with slit numbers (the bottom graph of FIG. 31).

The distribution state of the slit gap values of the slits 16 for the resin A at slits A-1 to A-301 according to the above design values is shown by line ASG in the top graph of FIG. 31 (FIG. 31A), and the distribution state of the slit gap values of the slits 17 for the resin B at slits B-1 to B-300 according to the above design values is shown in the bottom graph of FIG. 31 (FIG. 31B). The graphs of FIG. 31 correspond to the graphs of FIG. 26.

Figure 32:
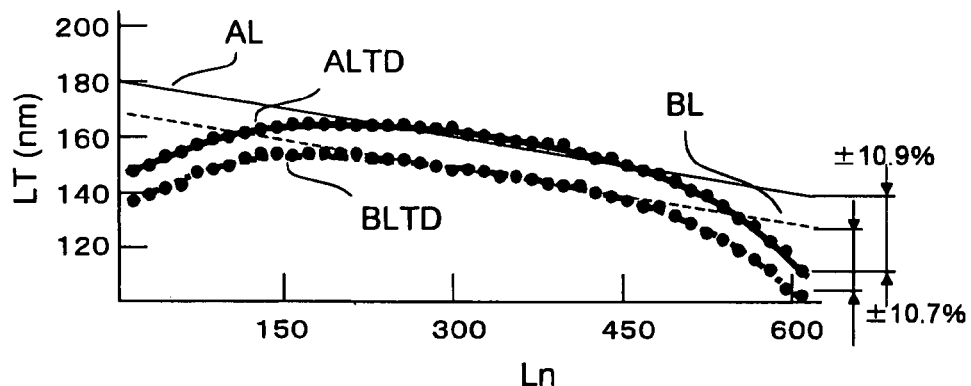
FIG. 32 is a graph showing the distribution of measured thicknesses of the respective layers composed of the resin A and the distribution of measured thicknesses of the respective layers composed of the resin B in the laminated sheet produced using the slit plate having the distribution state of slit gaps shown in FIG. 31, together with distributions of intended thicknesses, in relation with layer numbers.

The multilayer feed block 11 as designed above was used to produce a multilayer film. A multilayer film having layer thickness distributions as shown in FIG. 32 was obtained. The graph of FIG. 32 corresponds to the graph of FIG. 27.

In order to let the thicknesses of the respective layers agree with the initial design values (intended values) as far as possible, the dimension values of the respective slits for correction were obtained by calculation using the relation shown in the formula (I) based on the measured thickness information of the respective layers A and the respective layers B of the produced multilayer film shown in FIG. 32.

Figure 33:
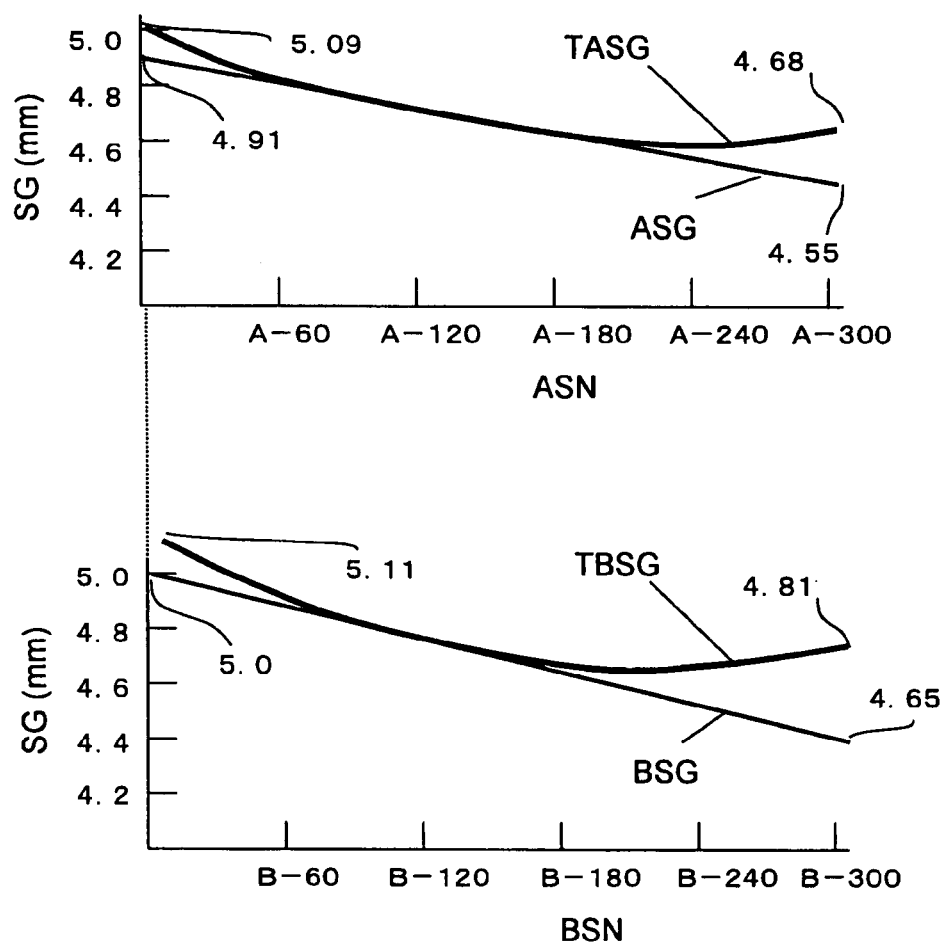
FIG. 33 is a graph showing the distribution state of the slit gaps of the slits which the resin A passed through after the slit gaps were changed in Example 4, in relation with slit numbers (the top graph of FIG. 33) and a graph showing the distribution state of the slit gaps of the slits which the resin B passed through after the slit gaps were changed in Example 4, in relation with slit numbers (the bottom graph of FIG. 33).

Based on the values obtained by calculation using the formula (I), the initial slit gaps of the respective slits were changed. The distribution state of the values obtained for correction, i.e., the intended slit gap values of the slits 16 for the resin A at slits A-1 to A-301 is expressed by line TASG in the top graph of FIG. 33 (FIG. 33A), and the distribution state of the values obtained for correction, i.e., the intended slit gap values of the slits 17 for the resin B at slits B-1 to B-300 is expressed by line TBSG in the bottom graph of FIG. 33 (FIG. 33B). The graphs of FIG. 33 correspond to the graphs of FIG. 31, and FIG. 33 also shows the lines ASG and BSG of FIG. 31.

Figure 34:
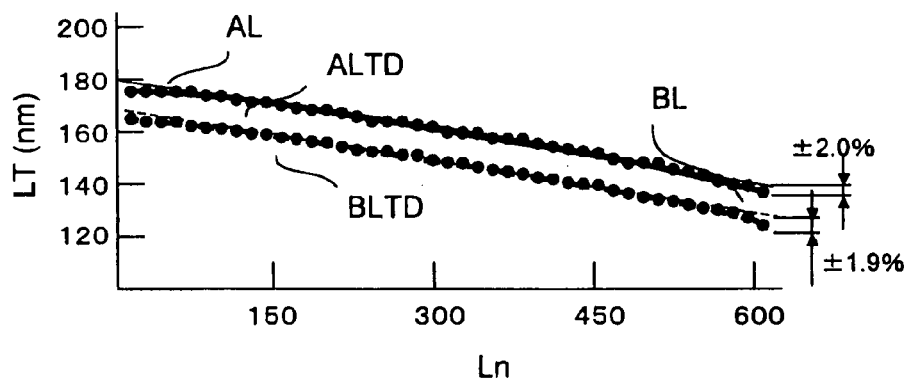
FIG. 34 is a graph showing the distribution of measured thicknesses of the respective layers composed of the resin A and the distribution of measured thicknesses of the respective layers composed of the resin B in the laminated sheet produced using the slit plate having the distribution state of slit gaps shown in FIG. 33, together with distributions of intended thicknesses, in relation with layer numbers.

The slit plate 20 having the dimensions obtained for correction was used to produce a multilayer film. The layer thickness distributions ALTD and BLTD of the obtained multilayer film were remarkably improved as shown in FIG. 34 and both the layers A and the layers B showed thickness distributions very close to the intended thickness distributions, to show that an intended multilayer film was obtained. The graph of FIG. 34 corresponds to the graph of FIG. 29.

The above explained mainly the results of Example 4. The particular method for producing the multilayer film of Example 4 is as follows.

Resin A: PET resin (thermoplastic resin F20S produced by Toray Industries, Inc.),
Resin B: Cyclohexanedimethanol-copolymerized PET (thermoplastic resin PETG6763 produced by Eastman),
Supply of resins: The respective resins were dried and supplied into an extruder. The temperature of the molten resins in the extruder was set at 280° C. Both the resins were respectively fed through a gear pump and a filter and supplied into a multilayer feed block 11 for forming 601 layers, for being laminated to form a laminated sheet composed of the resins A and B.

Multilayer feed block: Molten resins were discharged from the slits 16 and 17 (machining accuracy 0.001 mm) corresponding to 301 layers A and 300 layer B to obtain a laminated sheet with a lamination ratio of the molten resin A to the molten resin B of A:B=0.95:1 and having layers A as both the surface layers.

Discharge of laminated sheet: The obtained layer streams of molten resins were supplied into the T die 5 shown in FIG. 1, for being molded into a sheet, and the sheet was quickly cooled and solidified on an electrostatically charged (DC voltage 8 kV) casting drum 7 with a surface temperature of 25° C.

Surface treatment of laminated sheet: The cast film 8 was treated with corona discharge in air on both the surfaces, so that the surfaces of the film (base film) had wet tension of 55 mN/m. The base film was coated, on each of the treated surfaces, with a coating solution capable of forming a laminated layer of (a polyester resin with a glass transition temperature Tg of 18° C.)/(a polyester resin with a glass transition temperature Tg of 82° C.)/(silica particles with an average particle size of 100 nm), to form a transparent, lubricating and adhesive surface layer each on the surfaces of the base film.

Heat treatment of laminated sheet: The surface-treated laminated sheet was introduced into a biaxially drawing machine, and preheated using hot air having a temperature of 95° C., then being drawn to 3.5 times in the machine direction and in the transverse direction. It was further heat-treated using hot air having a temperature of 230° C. and simultaneously treated for 5% relaxation in the machine direction, and in succession treated for 5% relaxation also in the transverse direction, being gradually cooled to room temperature and subsequently wound.

Produced multilayer film: The obtained multilayer film had the primary reflection peak in a wavelength range of 900 to 1,050 nm and had a reflectance of 92%. It was a colorless transparent excellent near infrared filter capable of efficiently reflecting broad-band near infrared light and showing little higher-order reflectance in the visible light range.

EXAMPLE 5

As the design values of the multilayer film 31*b* shown in FIG. 22, the following values were employed.

Lamination ratio A/B of resin A to resin B: Lamination ratios in a range from 1/9 to 9/1, Total number of layers: 201, Thicknesses of respective layers of resin A (respective layers A): Having a distribution from 7 nm to 70 nm, and Thicknesses of respective layers of resin B (respective layers B): Having a distribution from 7 nm to 70 nm like the respective layers of resin A.

As the design values of the slit plate 20 of the multilayer feed block 11 shown in FIG. 18, the following values were employed for the respective slits 16 (slits A-1 to A-101) which the resin A flowed through, and the slits 17 (slits B-1 to B-100) which the resin B flowered through, respectively shown in FIG. 30.

Slit gaps of respective slits 16 corresponding to respective layers A: Having a distribution from 0.35 to 0.75 mm, and Slit gaps of respective slits 17 corresponding to respective layers B: Having a distribution from 0.35 to 0.75 mm like the slit gaps of respective slits 16.

Figure 35:
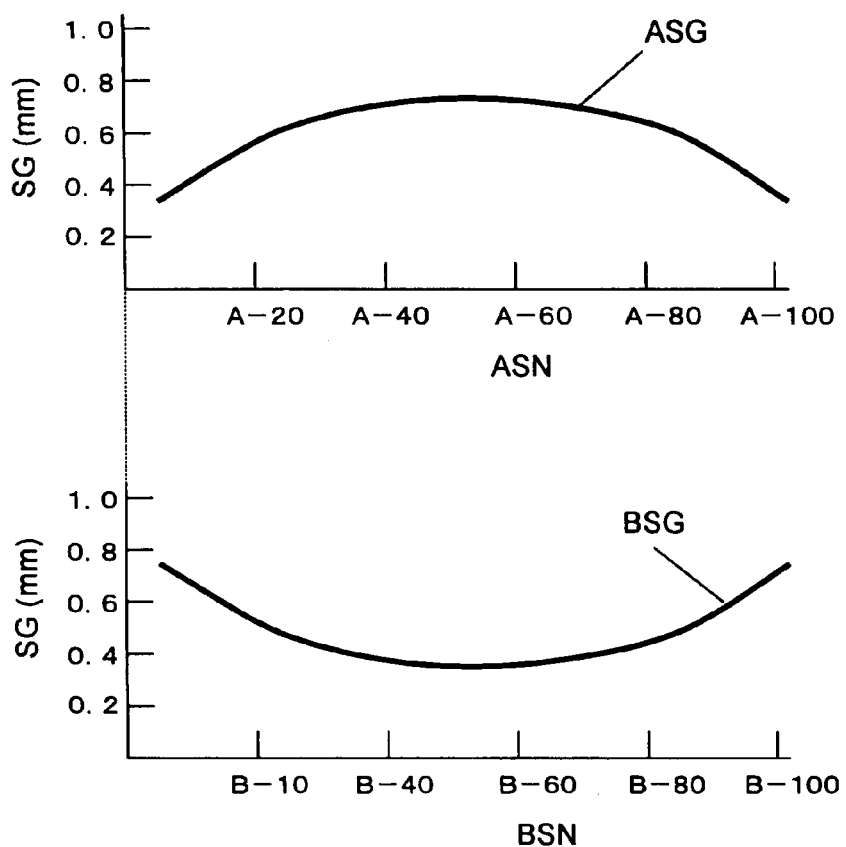
FIG. 35 is a graph showing the distribution state of the slit gaps of the slits which the resin A passed through before the slit gaps were changed in Example 5, in relation with slit numbers (the top graph of FIG. 35) and a graph showing the distribution state of the slit gaps of the slits which the resin B passed through before the slit gaps were changed in Example 5, in relation with slit numbers (the bottom graph of FIG. 35).

The distribution state of the slit gap values of the slits 16 for the resin A at slits A-1 to A-101 according to the design values is expressed by line ASG in the top graph of FIG. 35 (FIG. 35A), and the distribution state of the slit gap values of the slits 17 for the resin B at slits B-1 to B-100 according to the design values is expressed by line BSG in the bottom graph of FIG. 35 (FIG. 35B). The graphs of FIG. 35 correspond to the graphs of FIG. 26.

Figure 36:
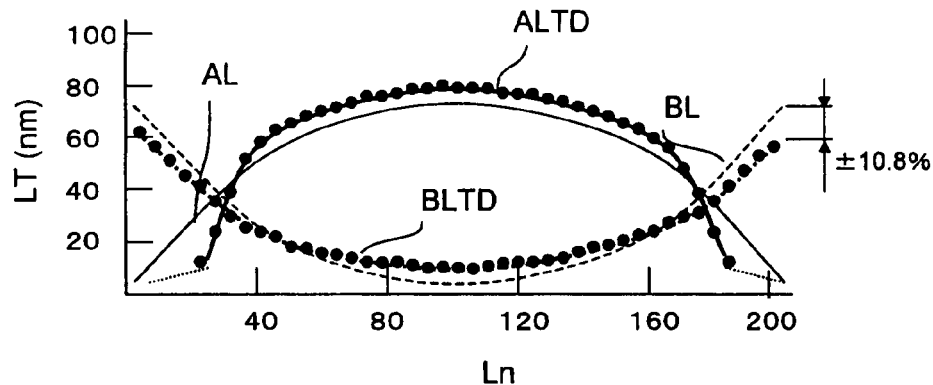
FIG. 36 is a graph showing the distribution of measured thicknesses of the respective layers composed of the resin A and the distribution of measured thicknesses of the respective layers composed of the resin B in the laminated sheet produced using the slit plate having the distribution state of slit gaps shown in FIG. 35, together with distributions of intended thicknesses, in relation with layer numbers.

The multilayer feed block 11 designed as described above was used to produce a multilayer film, and a multilayer film having layer thickness distributions as shown in FIG. 36 was obtained. The graph of FIG. 36 corresponds to the graph of FIG. 27.

In order to let the respective layer thicknesses agree with the initial design values (intended values) as far as possible, the dimension values of the respective slits for correction were obtained by calculation using the relation shown in the formula (I) based on the measured thickness information of the respective layers A and respective layers B of the produced multilayer film shown in FIG. 36.

Figure 37:
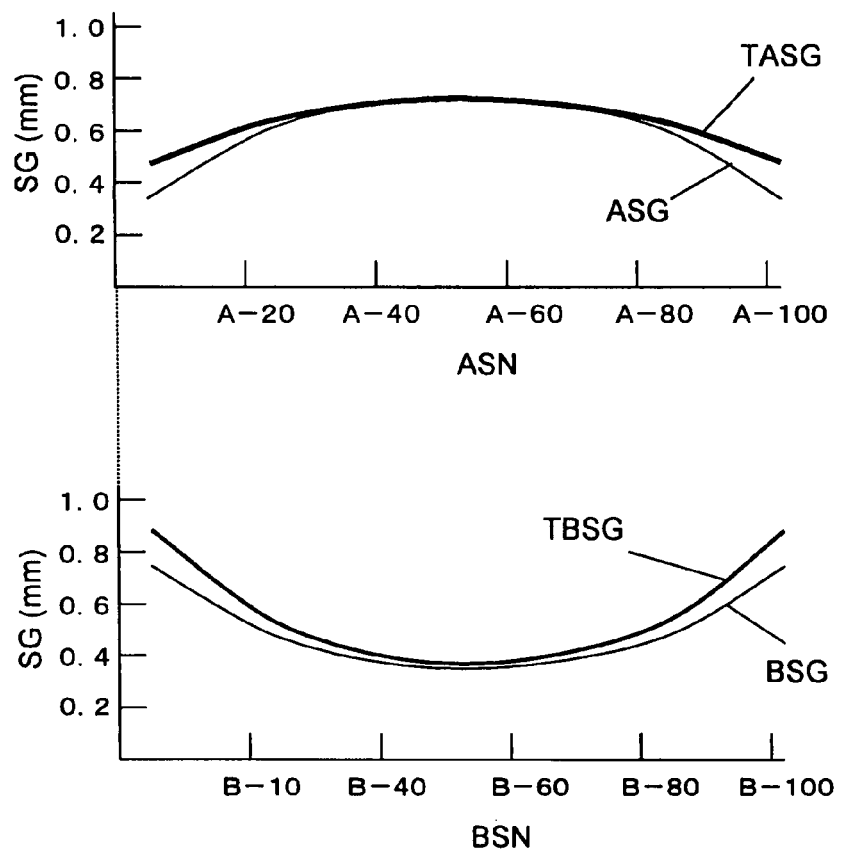
FIG. 37 is a graph showing the distribution state of the slit gaps of the slits which the resin A passed through after the slit gaps were changed in Example 5, in relation with slit numbers (the top graph of FIG. 37) and a graph showing the distribution state of the slit gaps of the slits which the resin B passed through after the slit gaps were changed in Example 5, in relation with slit numbers (the bottom graph of FIG. 37).

Based on the values obtained by calculation using the formula (I), the initial slit gaps of the respective slits were changed. The distribution state of the values obtained for correction, i.e., the intended slit gap values of the slits 16 for the resin A at slits A-1 to A-101 is expressed by line TASG in the top graph of FIG. 37 (FIG. 37A), and the distribution state of the value obtained for correction, i.e., the intended slit gap values of the slits 17 for the resin B at slits B-1 to B-100 is expressed by line TBSG in the bottom graph of FIG. 37 (FIG. 37B). The graphs of FIG. 37 correspond to the graphs of FIG. 35, and FIG. 37 also shows the lines ASG and BSG of FIG. 35.

Figure 38:
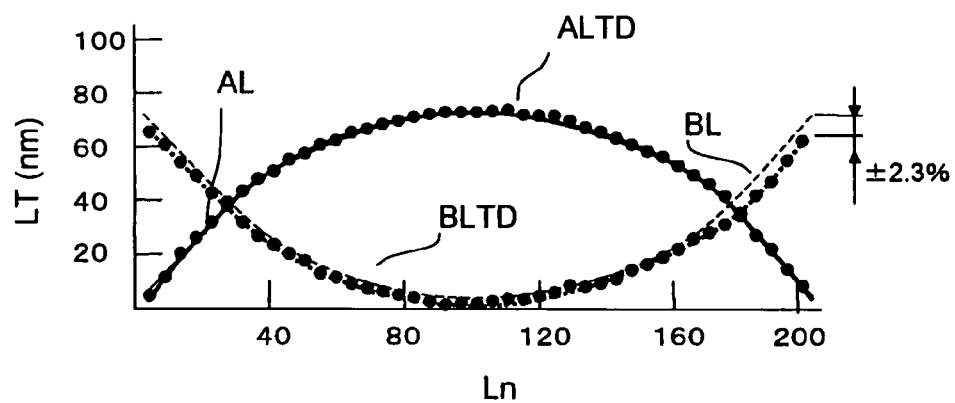
FIG. 38 is a graph showing the distribution of measured thicknesses of the respective layers composed of the resin A and the distribution of measured thicknesses of the respective layers composed of the resin B in the laminated sheet produced using the slit plate having the distribution state of slit gaps shown in FIG. 37, together with distributions intended thicknesses, in relation with layer numbers.

The slit plate 20 having the dimensions obtained for correction was used to produce a multilayer film. The layer thickness distributions ALTD and BLTD of the obtained multilayer film were remarkably improved as shown in FIG. 38, and the thickness distributions of both the layers A and the layers B were very close to the intended thickness distributions. So, an intended multilayer film was obtained. The graph of FIG. 38 corresponds to the graph of FIG. 29.

The above explained mainly the results of Example 5. The particular method for producing the multilayer film of Example 5 is as follows.

Resin A: PET resin (thermoplastic resin F20S produced by Toray Industries, Inc.), Resin B: Cyclohexanedimethanol-copolymerized PET (thermoplastic resin PETG6763 produced by Eastman), Supply of resins: The respective resins were dried and supplied into an extruder. The temperature of the molten resins in the extruder was set at 280° C. Both the resins were respectively fed through a gear pump and a filter and were supplied into a multilayer feed block 11 for forming 201 layers, for being laminated to form a laminated sheet composed of the resins A and B.

Multilayer feed block: From the slits 16 and 17 (machining accuracy 0.01 mm) corresponding to 101 layers A and 100 layers B, the molten resins were discharged to form a laminated sheet with the lamination ratio of the molten resin A to the molten resin B kept in a range from A:B=1:9 to 9:1 and having layers A as both the surface layers.

Discharge of laminated sheet: The obtained layer streams of the molten resins were supplied into the T die 5 shown in FIG. 1 and molded into a sheet, and the sheet was quickly cooled and solidified on an electrostatically charged (DC voltage 8 kV) casting drum 7 with a surface temperature of 25° C.

Surface treatment of laminated sheet: The cast film 8 was treated on both the surfaces with corona discharge in air, so that the surfaces of the film (base film) had wet tension of 55 mN/m. The film was coated, on each of the treated surfaces, with a coating solution capable of forming a laminated layer of (a polyester resin with a glass transition temperature Tg of 18° C.)/(a polyester resin with a glass transition temperature Tg of 82° C.)/(silica particles with an average particle size of 100 nm), to form a transparent, lubricating and adhesive surface layer each on the surfaces of the base film.

Heat treatment of laminated sheet: The surface-treated laminated sheet was introduced into a biaxially drawing machine, and preheated using hot air having a temperature of 95° C., then being drawn to 3.5 times in the machine direction and in the transverse direction. It was further heat-treated using hot air having a temperature of 230° C. and simultaneously treated for 5% relaxation in the machine direction, and in succession treated for 5% relaxation also in the transverse direction, being gradually cooled to room temperature and subsequently wound.

Produced multilayer film: In both the surface layer portions of the obtained multilayer film, the thickness of the layer A was 7 nm, and the thickness of the layer B was 70 nm. In the central portion of the thickness, the thickness of the layer A was 70 nm, and the thickness of the layer B was 7 nm. Furthermore, the thicknesses of the layers A monotonously increased from 7 nm in the surface layer portions to 70 nm in the central portion, and on the other hand, the thicknesses of the layers B monotonously decreased from 70 nm in the surface layer portions to 7 nm in the central portion. The obtained multilayer film had a thickness of 7.8 µm and was excellent in wave-guide performance. The above examples explained cases where a laminated sheet or multilayer film composed of two resins was produced. However, also in the case where three or more manifolds and three or more slit rows corresponding to them are used, if the invention is applied to at least two resins (that is, at least two manifolds and at least two slit rows corresponding to them), the same effects as obtained in the above examples can be obtained.

INDUSTRIAL APPLICABILITY

The invention relates to a laminated sheet production apparatus and method suitable for producing a multilayer film. The laminated sheet produced according to the invention is formed by laminating plural kinds of molten materials (for example, molten resins or molten polymers) in plural layers as many as more than the number of the kinds of molten materials and subsequently solidifying the molten resins. According to the invention, a laminated sheet in which the thicknesses of the respective layers in the width direction of the laminated sheet have intended values or design values can be easily produced. That is, according to the invention, a laminated sheet in which the thicknesses of the respective layers are kept as accurate as intended in the width direction of the laminated sheet can be easily produced. A laminated sheet produced according to the invention has an optical feature attributable to the accurate different thicknesses of the respective layers and can be preferably used as a broad-band interference reflection film, a refractive index-controlled film or a laminated film with layer thicknesses in the nano-order.

The invention claimed is:

1. An apparatus for producing a laminated sheet, in which plural kinds of molten materials are laminated in plural layers as many as more than the number of said kinds of molten materials, comprising plural manifolds respectively used for supplying said respective molten materials, a slit plate placed between said manifolds, plural slits each formed in said slit plate and provided in correspondence to said respective manifolds and disposed with predetermined intervals kept between them so that said molten materials supplied into said respective manifolds can pass through the slits corresponding to said respective layers, and a laminating portion for laminating said molten materials having passed through said respective slits in order to form said layers, wherein each of said slits formed in said slit plate is closed to an outlet of one of said manifolds and has an inlet formed to be directly open to an outlet of another one of said manifolds, and wherein each of said slits has a top side inclined section that is inclined downwardly in the downstream direction of the molten materials as they leave from the manifolds, and further comprising two lateral plates between which the slit plate is placed, each of said lateral plates defining one of said manifolds, wherein each of said slits formed in said slit plate is closed to an outlet of one of said manifolds by a wall surface of said lateral plate defining said one of said manifolds.

2. The apparatus according to claim 1, wherein said inclined section extends straight.

3. The apparatus according to claim 1, wherein each of said lateral plates contacts said slit plate along a plane and the manifold defined in each of said lateral plates extends to said plane.

4. The apparatus according to claim 1, wherein each of said plural slits formed in correspondence to at least two manifolds out of said plural manifolds is such that in the width direction of said slit in the flow path of the corresponding molten material from the outlet of the corresponding manifold to the outlet of said slit, the ratio L1/L2 of the flow path length L1 of the first flow path portion on the side near said manifold to the flow path length L2 of the second flow path portion on the side far from said manifold is 0.5 or more.

5. The apparatus according to claim 4, wherein the upstream section of said second flow path portion is formed as a flow path section kept inclined more downward in the downstream direction as it leaves from said manifold.

6. The apparatus according to claim 5, wherein said inclined flow path section is formed as an inclined flow path section inclined straight.

7. The apparatus according to claim 1, wherein a slit width at the outlet of each of the slits is from 10 mm to 200 mm.

8. The apparatus according to claim 1, wherein a slit gap of each of the slits is from 0.1 mm to 5 mm.

9. The apparatus according to claim 1, wherein a flow path length LC of the central flow path portion passing through the center in the width direction of each of the slits in said flow path of the slit is from 20 mm to 200 mm.

10. The apparatus according to claim 1, wherein the number of said plural slits is from 10 to 1,000.

11. The apparatus according to claim 1, wherein a slit length of at least one slit of said plural slits and a slit length of at least one slit of the other slits are different from each other or a slit gap of at least one slit of said plural slits and a slit gap of at least one slit of the other slits are different from each other.

12. The apparatus according to claim 11, wherein except or including the slits located at both ends of said plural slits, the slit lengths of said respective slits change monotonously in the arrangement direction of said slits from the slit at one end toward the slit at the other end.

13. The apparatus according to claim 11, wherein the slit lengths of said respective slits are from 10 mm to 200 mm.

14. The apparatus according to claim 11, wherein except or including the slits located at both ends of said plural slits, the slit gaps of plural slits corresponding to said respective molten materials are substantially the same.

15. The apparatus according to claim 11, wherein the slit gaps of said respective slits are from 0.1 mm to 5 mm.

16. The apparatus according to claim 11, wherein the number of said plural slits is from 10 to 1,000.

17. A method for producing a laminated sheet comprising supplying plural kinds of molten materials respectively into the plural manifolds of the apparatus for producing a laminated sheet as set forth in any one of claims 1 through 16, letting said molten materials supplied into said respective manifolds pass through the plural slits provided in correspondence to the respective manifolds of said apparatus, laminating the streams of said respective molten materials having passed through the respective slits, by means of the laminating portion of said apparatus, for forming layer streams of said respective molten materials, deriving said layer streams from said laminating portion, and solidifying said respective molten materials of the derived layer steams, to form a laminated sheet comprising plural layers of respective materials formed by solidifying the respective molten materials.

18. The apparatus according to claim 1, wherein a flow rate of the corresponding one of said molten materials, flowing through at least one slit of said plural slits, can be changed based on layer thickness information obtained by measuring thickness of desired layers of a formed laminated sheet.

19. The apparatus according to claim 18, wherein the flow rate of said molten material is changed by changing the slit gap and/or the slit length of said slit.

20. The apparatus according to claim 19, wherein a measurement of the thickness of said layers is performed for all the respective layers of the laminated sheet, and the flow rate of said molten material is changed by changing said slit gap.

21. The apparatus according to claim 20, wherein the flow rate of said molten material is changed by making the slit gaps of the slits used for forming layers positioned in outer layer portions in the thickness direction of the laminated sheet larger than the slit gap of the slit used for forming a layer positioned in an inner layer portion.

22. The apparatus according to claim 19, wherein the measurement of the thickness of said layers is performed for all the respective layers of the laminated sheet, and the flow rate of said molten material is changed by changing said slit length.

23. The apparatus according to claim 15, wherein the flow rate of said molten material is changed by making the slit lengths of the slits used for forming layers positioned in outer layer portions in the thickness direction of said laminated sheet shorter than the slit length of the slit used for forming a layer positioned in an inner layer portion.

24. The apparatus according to claim 18, wherein the flow rate of said molten material is changed by changing the temperature of said molten material passing through the slit caused by changing the temperature of said slit.

25. The apparatus according to claim 18, wherein the flow rate of said molten material is changed by mechanically or thermally changing the slit gap and/or the slit length of at least one slit of said plural slits.

26. The apparatus according to claim 18, wherein if the measured thickness value of a given layer x in the thickness direction of said laminated sheet is $T(x)$, the slit gap corresponding to the measured thickness value is $d(x)$, the intended thickness of said layer x is $Ta(x)$, the intended slit gap corresponding to the intended thickness is $da(x)$, and the intended slit length is $La(x)$, then the flow rate of said molten material in the slit corresponding to said layer x is changed to satisfy the relation represented by the following formula:

$$Ta(x)/T(x)=[La(x)/L(x)]\times[d(x)^3/da(x)^3].$$

27. A method for producing a laminated sheet comprising supplying plural kinds of molten materials respectively to the plural slits of the apparatus for producing a laminated sheet as set forth in any one of claims 18 through 26, and forming a laminated sheet using said apparatus.

* * * * *